Inventor
S. ITO
By Walter J. Baum
Attorney

Inventor
S. ITO
By Walter J Baum
Attorney

Inventor
S. ITO
By Walter J. Baum
Attorney

Aug. 26, 1969 SUKEHIRO ITO 3,463,887

TIME-DIVISION MULTIPLEXED PCM TRANSMISSION SYSTEM

Filed Nov. 3, 1964 4 Sheets-Sheet 4

Inventor
S. ITO
By Walter J. Baum
Attorney 3,463,887

TIME-DIVISION MULTIPLEXED PCM TRANSMISSION SYSTEM

Sukehiro Ito, Tokyo, Japan, assignor to Nippon Electric Company, Limited, Tokyo, Japan, a corporation of Japan Filed Nov. 3, 1964, Ser. No. 408,517
Claims priority, application Japan, Nov. 7, 1963, 38/60,066
Int. Cl. H04j 3/02
U.S. Cl. 179—15 17 Claims

ABSTRACT OF THE DISCLOSURE

A time division multiplex PCM transmission system is provided according to this invention wherein the transmitted information signals and the received information signals includes both a frame synchronizing series in a specified channel location of said information signals as well as a discrete synchronizing pulse located in each channel position of said information signal whereby rapid discovery and correction of a true non-synchronous condition is achievable. Further, apparatus for synchronizing the transmitter and receiver in such a time division multiplex PCM transmission system is provided, according to one embodiment of this invention, wherein if a loss of synchronism with regard to a channel and a frame occurs substantially simultaneously, the restoration of a synchronous condition occurs according to a fixed priority schedule whereby the synchronous condition of a channel will first be restored and thereafter the synchronous condition of the frame will be restored.

This invention relates to a multiplexed data transmission system for transmitting information signal groups, such as telephone signals, through a wireless transmission path and more particularly to a synchronizing system for this type of system.

In time-division multiplexed PCM communication systems synchronism between the transmitter and the receiver has been maintained heretofore by use of a frame synchronizing pulse series which is composed of a specific combination or train of binary code elements interposed at portions of the PCM pulse series. One of the proposals for interposing the frame synchronizing pulse series in the PCM pulse series would place (at the beginning and at the end of each frame) a frame synchronizing pulse group having a specific combination of binary code elements which are equal in number to a channel information pulse group. Another proposal would interpose, between adjacent frames, a unit pulse which alternatingly assumes the "1" and the "0" states. The former proposal is of advantage because disturbed synchronism can be discovered very rapidly; however, this proposal has the disadvantage that synchronism would be disturbed if pulses having the same pattern as the frame synchronizing pulse group are present in the received PCM pulse series. The latter proposal does not have this disadvantage; however, it in turn has the disadvantage that is, requires a fairly long time to restore synchronism. In a wireless transmission path, particularly a long distance path such as an over-the-horizon microwave path, interruption of the path is inevitable because of fading. It is therefore important, in a long-distance wireless time-division multiplexed PCM communication system to insure synchronim despite the tendency to fall out of synchronism because of interruptions in the transmission path. In other words, a synchronizing system is urgently required which can rapidly and correctly confirm loss of synchronism. More particularly, a system is required which can rapidly detect any loss of synchronism and which will never operate improperly by picking up a false synchronizing pulse resulting from a pulse arrangement in the PCM pulse series and/or from noise becoming dominant during fading and/or by being disturbed by any error introduced into the true synchronizing pulse train by noise. Furthermore, the system should be able to rapidly restore synchronism and confirm the restoration of synchronism after a loss of synchronism. No known prior art system has been able to attain these goals because it has been impossible to simultaneously satisfy these requirements with conventional synchronizing systems.

An object of this invention is, therefore, to provide a synchronizing system for a multiplexed data transmission system which is capable of rapidly and correctly confirming any loss of synchronism and which can very rapidly restore synchronism.

Another object of this invention, therefore, is to provide a multiplexed data communication system in which loss of synchronism between the transmitter and receiver can be both rapidly detected and rapidly restored.

Another object of this invention is to provide a novel method for synchronizing the transmitter and receiver in a multiplexed data transmission system.

The synchronizing system of this invention includes a transmitter having means for producing a series of frame synchronizing pulse groups each of which is composed of a specific combination of binary code elements that are equal in number to each channel information pulse group and which are placed at the beginning of each frame. The transmitter further includes means for producing a channel synchronizing pulse train composed of unit pulses which are to be interposed between adjacent channel information pulse group and which alternatingly assume the "1" and "0" states. Additionally, means are provided for inserting the frame synchronizing pulse groups and the channel synchronizing pulses into the multiplexed channel information pulse train.

The system further includes a receiver having means for discovering any loss of channel synchronism by monitoring the channel synchronizing pulses in the received multiplexed pulse train and detection means for discovering any loss of frame synchronism and for confirming restoration of the frame synchronism by monitoring the frame synchronizing pulse groups in the received pulse train. The detection means produce a frame synchronism detection pulse only upon reception of each true frame synchronizing pulse group. Thereafter, the frame synchronism detection pulses are compared with pulses produced in the receiver which are presumed to correspond (on a time basis) to the frame synchronizing pulse groups. If any loss of frame synchronizing is detected (after a short time interval required to confirm whether or not the detected loss of synchronism is a true one) a frame synchronism error signal is generated which suspends distribution of the channel information pulse groups to the respective channels. Upon recovery of frame synchronism (and after a short time interval required to confirm whether or not the recovery is a true one) means are provided for terminating the generation of the frame synchronism error signal to allow distribution of the channel information pulse groups into the respective channels to resume. The receiver further includes means for shifting (only on simultaneous detection of loss of the frame and the channel synchronism), by one bit the pulses for monitoring the channel synchronism until recovery of the channel synchronism is achieved and means for immediately restoring frame synchronism by resetting the channel distribution signals with the frame synchronism detection pulse after channel synchronism has been restored and only the frame synchronism error signal is present.

As heretofore explained, the synchronizing system of this invention makes use of a synchronizing pulse train which is composed of frame synchronizing pulse groups and channel synchronizing pulses. A false frame synchronizing pulse group or a pulse group having the same pattern as a true synchronizing pulse group, therefore, rarely occurs in a PCM pulse train. However, even if one should occur the frame synchronism detection pulse will be produced in the receiver only upon reception of a frame synchronizing pulse group by monitoring the channel information pulse groups bounded by the channel synchronizing pulses, with the result that false frame synchronizing pulse groups will never cause the synchronizing system to operate improperly. If a false frame synchronizing pulse group is received due to noise resulting from fading or because a frame synchronizing pulse group is lost due to instantaneous interruption of the transmission path, the frame synchronism error signal will not be produced provided correct synchronism is maintained in the receiver thereby preventing the synchronizing system from indicating a loss of synchronism when in fact there is no loss of synchronism. Inasmuch as the time required to check whether correct synchronism is maintained is the minimum time required to confirm a true loss of frame synchronism, it is possible to correctly and rapidly make such a check.

If loss of frame synchronism has been confirmed and if loss of channel synchronism has also been detected, channel synchronism will be restored first. As will be explained hereinafter, in conjunction with a preferred embodiment of the invention, if each channel information pulse group has seven digits (as is usual), channel synchronism can be restored within a maximum of fifteen bit intervals. Within one frame interval, at the maximum, after the channel synchronism has been restored, the frame synchronism will be restored by resetting the channel distribution signals with the frame synchronizing pulse groups detected in the received PCM pulse train. Inasmuch as recovery of the frame synchronism can be confirmed by the very next frame synchronizing pulse group detected in the received PCM pulse train just after the elapse of one frame interval, the maximum time required for complete recovery of the frame synchronism (including confirmation of the recovery) is as short as two frame intervals.

In this manner, it is possible with a synchronizing system of the invention to rapidly and correctly confirm any loss of synchronism and to very rapidly restore the synchronism after loss of synchronism has been confirmed. The technical merits of the synchronizing system of the invention are therefore quite remarkable, particularly for long-distance wireless communication systems although they are none the less remarkable in other communication systems.

The above-mentioned and other features and objects of this invention and the means for attaining them will become more apparent and the invention itself will be best understood by reference to the following description of embodiments of the invention taken in conjunction with the accompanying drawings in which.

Figure 1:
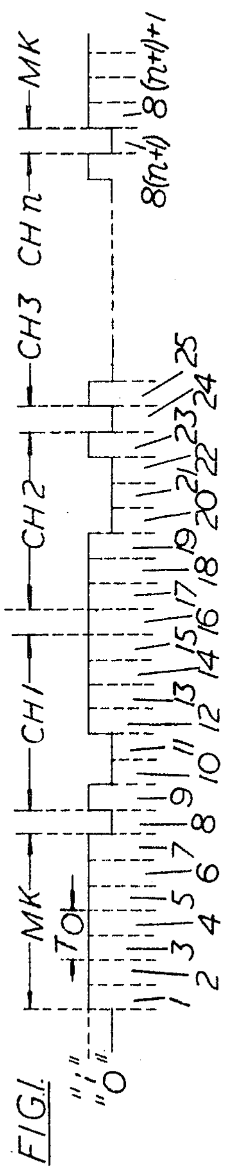
FIG. 1 illustrates how the synchronizing pulses are interposed among the pulses of a time-division multiplexed PCM channel information train according to one aspect of the invention.

Reference will now be had to FIG. 1 which shows the arrangement according to this invention of the synchronizing pulses which includes the frame synchronizing pulse groups and the channel synchronizing pulses. FIG. 1 will be used to explain the fundamental principle of the invention.

On the transmitter side of a time-division multiplexed PCM communication system, voice signals having frequency components ranging from 300 to 3,400 cycles are usually sampled at a repetition frequency of eight kilocycles and the thus sampled values are quantized by use of a finite number of quantization levels. Although dependent upon the quality requirements for the transmitted signals, 127 quantization levels will usually be used when conventional non-linear quantization is utilized. Therefore, it is possible to transmit the information obtained by quantizing a sampled value of a particular channel, by means of a group of seven unit pulses or a seven-digit binary code element group in a time interval of seven times the unit, or the bit interval $T_0$. If the bit positions are numbered as shown in FIG. 1 from left to right 1, 2, 3, . . ., $8(n+1)$, . . . ; then a sampled value for the first channel CH1 will be transmitted in the ninth through the fifteenth bit positions; the sampled values for the second channel CH2, in the seventeenth through the twenty-third bit positions; . . . ; the samples values for the $n$th channel CH$n$, in the $(8n+1)$th through the $(8n+7)$th bit positions; etc.

In a time-division multiplexed PCM communication system wherein as mentioned above, the information of every channel is transmitted cyclically by means of a binary or a N-ary code of a plurality of digits, it is necessary to maintain frame synchronism between the transmitter and the receiver in order to decode the codes received by the receiver and distribute them into the respective receiver channels. Maintaining frame synchronism will permit the receiver to identify which portion of a series of the received code elements corresponds to the code element group representing the information of a particular channel. Should multiplexed telephone signals be transmitted along a wireless transmission line, synchronism is likely to be lost due to a line fault or an interruption introduced by inherent fading etc. Where such signals are transmitted either along wire lines or along coaxial cables, the problem is not as serious. However, for wireless systems it will now be realized that a synchronizing system is urgently required to rapidly detect and restore synchronism whenever a fault has occurred.

Consequently, it is proposed according to this invention to assign to a frame synchronizing pulse group the same number of code elements as those assigned to a sampled value of a channel and to give this frame synchronizing pulse group a specific combination of binary code elements. In FIG. 1, the first through the seventh bit positions are assigned to a frame synchronizing pulse group MK, which has the code combination (1111111). If a sampled value is quantized utilizing 127 quantization levels, it will be possible to provide the frame synchronizing pulse group a specific code combination among the $2^7$ or 128 code combinations of seven-digit code elements and to keep correspondence between the remaining 127 code combinations and all the quantization levels. In other words, the code combination allotted to the frame synchronizing pulse group will never be used for any of the code combinations representing the sampled values of all the channels. This enables frame synchronism to be maintained between the transmitter and the receiver for detecting the specific code combination on the receiver side. With the example illustrated in FIG. 1, detection of a code combination (1111111) on the receiver side indicates that the information of the first through the $n$th channels will follow in order.

However, prior art systems which merely use such a frame synchronizing pulse group to maintain synchronism cannot always rapidly restore synchronism after an interruption has returned to normal. This is so because if $l$ digits at the end of a seven-digit binary code group in the $k^{th}$ channel are in the "1" state and more than $(7-l)$ digits at the beginning of the channel information pulse group of the $(k+l)$ channel are also in the "1" state, the detector for the frame synchronizing pulse group will erroneously respond to these pulses. Since the probability of such a circumstance existing is fairly good, the probability of erroneous synchronism detection is also great. It is to be noted that since the voice signals in every channel have only the frequency components ranging from 300 to 3,400 cycles and the repetition frequency of sampling is eight kilocycles, the same code combination is never repeated in a particular channel more than about twenty-seven times (eight kilocycles divided by 300 cycles). However, the same code combination is always repeated for the frame synchronizing pulse groups every 125 microseconds of sampling as illustrated in FIG. 1 at the first and the $8(n+l)$th bit positions. It is consequently possible to confirm in the receiver that the frame synchronism is being maintained by observing whether after the "1" state has continued for seven bit intervals, it is repeated every 125 microseconds (or more than twenty-seven times). It requires at least twenty-seven times 125 microseconds (or about 3.4 milliseconds) to confirm recovery of frame synchronism (which was lost due to the line fault etc.) Such confirmation can be obtained by assigning each frame synchronizing pulse group the same number of digits as that allotted to each of the channel information pulse groups and by giving the frame synchronized group a code combination which can never appear as a channel information pulse group.

According to the invention, not only are the frame synchronizing pulse groups formed as explained above, but also single synchronizing pulses (of one bit interval duration) are inserted between the code combinations of the adjacent channels. These single synchronizing pulses alternately assume the "0" and the "1" states, thereby eliminating the above-mentioned serious defect in wireless transmission system wherein instantaneous interruption of the line very often occurs on account of fading etc. In FIG. 1, the eighth, and sixteenth, . . . , the $8(n+l)$th, . . . bit positions are assigned to the single synchronizing pulses (herein called the channel synchronizing pulses), respectively. The state of these channel synchronizing pulses varies alternatingly in such a manner such that the state is "0" at the eighth bit position, "1" at the sixteenth bit position, and if ($n$ is an even number and consequently $n+l$ is an odd number) "0" and "1" at the $8(n+l)$th and the $[8(n+l)+8]$th bit positions, respectively. It will be realized that the channel synchronizing pulses need not alternate successively but may have any recurrent pattern which can be sensed, such as: 110; 001; 011; 100; 010; 0110; 1001; 111; etc. However, the description hereinafter will describe the case where the channel synchronizing pulses alternate successively.

In this manner the invention provides means for detecting on the receiver side these "0" and "1" pulses when the instantaneous interruption has returned to normal which interruption caused synchronism to be lost. These alternating pulses appear every eight bit intervals. Detection can be by either analogue techniques (for example by use of resonating means tuned to the repetition frequency of the channel synchronizing pulses) or by digital techiques (for example by monitoring coincidence between the received PCM pulses and pulses separately generated in the receiver in compliance with the prescribed arrangement of the channel synchronizing pulses to be detected). Inasmuch as it is extremely rare that all the pulses of a particular digit in even-numbered channels are in the "0" state and furthermore that all the pulses of the same digit in odd-numbered channels are in the "1" state (or that all these pulses are in the reversed state) it is possible to detect the channel synchronizing pulses without fail after the received PCM pulse train has been monitored for one sampling interval of 125 microseconds. Moreover, if the number of channels $q$ is an even number, the channel synchronizing pulses are all reversed as will be apparent from FIG. 1 every other sampling interval. It is practically impossible for all the pulses of a particular digit in every channel to reverse in a similar manner. The channel synchronizing pulses can therefore be detected without fail, after the received PCM pulse train has been monitored for two or three sampling intervals. If the channel synchronizing pulses have thus been detected to consequently define the boundaries of every channel information pulse group then the specific code combination detected cannot be a false frame synchronizing pulse group but a true one.

It will now be appreciated that it is possible according to this invention to markedly shorten the time required for completely restoring synchronism which has been lost due to an interruption of the transmission line.

Although it has been assumed in the foregoing that each channel information pulse group consists of seven-digit binary code elements, the invention is also applicable to a case where each channel information pulse group consists of less than seven digit or more than seven digit binary code elements, which number will be determined by the quality required of the transmitted information. Also, the binary code elements may be used for frequency, phase, or amplitude modulation of the carrier wave by themselves or after having been transferred into N-ary code pulses. Furthermore, the binary code elements which assume the "0" or "1" states need not do so throughout the bit interval but rather can assume "0" or "1" state for a fraction of a bit interval and a "0" state for the remaining fraction thereof.

Figure 2:
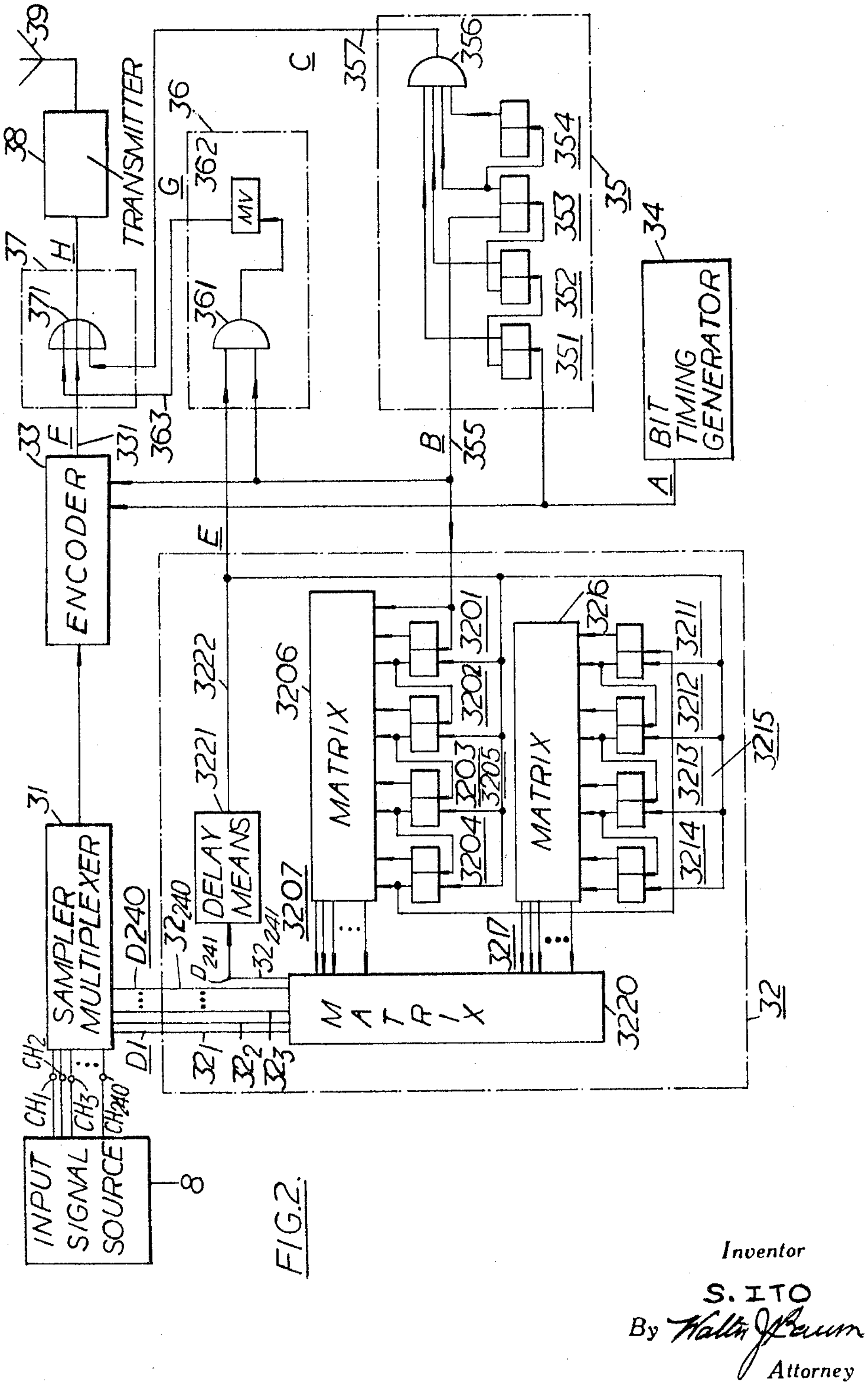
FIG. 2 is a circuit diagram, shown partly in block form, of one embodiment of a time-division multiplexed PCM wireless transmitter which includes one embodiment of the synchronizing system of this invention.

Referring to FIG. 2 there is illustrated therein a transmitter for a wireless communication system which can transmit and receive 240-channel telephone signals and which operates according to this invention. The voice signals from input source 8 on the first through the 240th channels CH1–CH240 are sampled at a sampler 31, in a cyclic manner beginning with the first channel CH1 in response to the channel control signals $D_1$–$D_{240}$ supplied from a channel control signal-and-frame synchronizing pulse control pulse generator 32 (hereinafter called a channel control pulse generator). Therefore, the voice signal of a particular channel will be sampled at a repetition frequency of eight kilocycles or at a sampling interval of 125 microseconds. The sampled signals are also time divisioned multiplexed at the sampler 31 which produces at the output thereof a time-division multiplexed amplitude-modulated pulse train (hereinafter called a PAM pulse train). The PAM pulse train is supplied to encoder 33 where the pulses are quantized into 127 levels by means of a bit timing signal A, supplied from bit timing signal generator 34. Bit timing signal A is used to synchronize the transmitter, and at the same time is encoded into a channel information pulse group (which is a combination of seven-digit binary code elements other than the specific code combination (1111111) assigned to the frame synchronizing pulse group). Thus, encoder 33 converts the PAM pulse train into a PCM channel information pulse train F. In the embodiment of FIG. 2 the same time interval is allotted to the frame synchronizing pulse group as is allotted to a channel information pulse group and is therefore composed of seven-digit binary code elements. The channel synchronizing pulses, each having one bit interval, however, are not only interposed between the frame synchronizing pulse group and the immediately preceding and succeeding channel information pulse groups but also between adjacent channel information pulse groups. The frequency of the bit timing signal A is:

$$8 \text{ kc.} \times (240+1) \times (7+1) = 15.424 \text{ mc.}$$

and the bit interval is about 65 millimicroseconds. The bit timing signal A is also supplied to a channel timing signal-and-channel synchronizing pulse generator 35 (hereinafter called a channel timing signal generator) which produces both a channel timing signal B (which determines at least the beginning of the time interval assigned to the frame synchronizing pulse groups and the channel information pulse groups) and a channel synchronizing "1" pulse train C. The channel timing signal B is supplied to both the encoder 33 (where it determines the time at which the PAM pulse train should be quantized and encoded) and to the channel control signal generator 32 which produces the channel control signals $D_1$–$D_{240}$. Furthermore, pulse train B is supplied to a frame synchronizing pulse generator 36. A frame synchronizing pulse control pulse train E is also supplied to generator 36 from the channel control pulse generator 32 to determine the time intervals (relative to the time intervals assigned to the frame synchronizing pulse groups), to produce a frame synchronizing pulse train G. The time-division multiplexed PCM channel information pulse groups, the channel synchronizing "1" pulses C, and the thus generated frame synchronizing pulse groups G are formed into a PCM pulse train H at synchronizing signal interposer 37 in the arrangement illustrated in FIG. 1. The PCM pulse train H is supplied to a wireless transmitter 38 where it is used to modulate a UHF or SHF carrier wave in the amplitude, phase, or phase-reversal modulation fashion. The modulated carrier wave is transmitted from an antenna 39 along the wireless transmission path.

Figure 3:
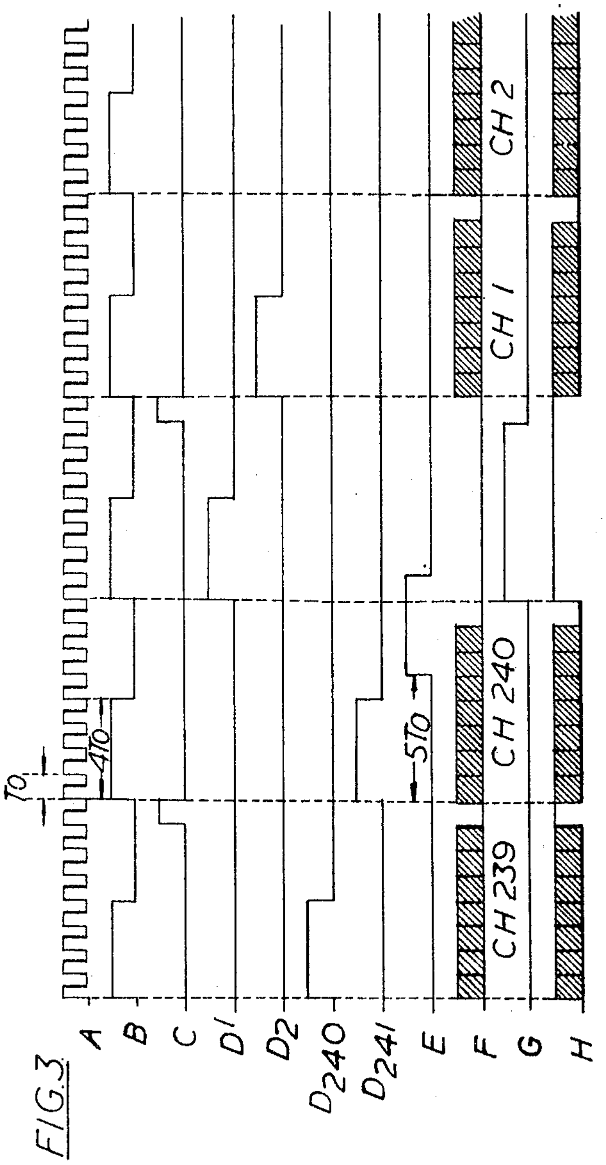
FIG. 3 illustrates waveforms obtained during the operation of a transmitter shown in FIG. 2 and will be used to explain the operation thereof.

Continuing to refer to FIGS. 2 and 3, the bit timing signal generator 34 includes: an electrical oscillation generator having excellent frequency stability, which is preferably a crystal-controlled oscillator; and a shaping circuit for shaping the output of the electrical oscillation generator, into the bit timing signal A or the rectangular pulse train shown in FIG. 3A. (In FIG. 3, time is shown on the abscissas while amplitude is plotted on the ordinate axis.) The bit timing signal has, in this example, a repetition frequency of 15.424 mc. that defines the boundaries of the bit positions of the PCM pulse train H with the leading edges of pulses therein (or the time at which the bit timing signal A rises from the "0" to the "1" state).

In FIG. 2, the channel timing signal generator 35 includes: a first flip-flop circuit 351 which is driven by the supplied bit timing signal A; a second flip-flop circuit 352 driven by the "1" output of the first flip-flop circuit 351; a third flip-flop circuit 353 driven by the "1" output of the second flip-flop circuit 352; a fourth flip-flop circuit 354 driven the "0" output of the third flip-flop circuit 353. A channel timing signal output lead 355 is provided for picking off the "1" output of the third flip-flop circuit 353 thereby to generate the channel timing signal B. A four-input AND gate 356 is provided in generator 35 which is supplied with the "0" outputs of the first through the fourth flip-flop circuit 351–354. A channel synchronizing pulse output lead 357 is connected to receive the output of the AND gate 356, which output is the channel synchronizing "1" pulses C. The first flip-flop circuit 351 will switch from the "0" to the "1" state, or vice versa in response to each bit pulse supplied thereto and thus wil cycle with every two bit pulses supplied. The second flip-flop circuit 352 will cycle in response to four bit pulses supplied to generator 35 and the third flip-flop circuit 353 will cycle once for every eight bit pulses supplied to generator 35. Therefore, the channel timing signal B has, as shown in FIG. 2B, a period eight times that of the bit timing signal A and defines the beginning of each PCM channel information pulse group with the leading edges of its pulses. The "0" output of the fourth flip-flop circuit 354 assumes the "0" and the "1" states every sixteen bit interval. Therefore, the channel synchronizing "1" pulses C will assume the "1" state once every sixteen-bit interval (a time interval containing the PCM channel information pulse groups for two channels) for every one bit interval (or one unit period) just prior to the beginning of a PCM channel information pulse of the next succeeding channel. The channel synchronizing "1" pulse train C thus provides the "1" pulses for the channel synchronizing pulse train mentioned with reference to FIG. 1.

The channel control signal generator 32 includes: a first binary four-digit flip-flop circuit group 3205 which has four flip-flop circuits 3201, 3202, 3203, and 3204 driven stepwise by the successive channel timing signals B supplied by the channel timing signal output lead 355. Generator 32 also has a first matrix 3206 responsive to those outputs of the first flip-flop circuit group 3205 that vary at periods of two, four, eight, and sixteen times the repetition period of the channel timing signal B which in turn covers eight bit intervals (hereafter referred to as a channel interval), respectively. Matrix 3206 is also connected to the channel timing signal B directly and formulates in response to the thus supplied inputs the logical products therebetween. Matrix 3206 has a group of leads 3207 (having sixteen leads) connected thereto and supplies outputs on these leads having a repetition period of sixteen channel intervals which have a duration of four bit intervals $4T_0$ and which are shifted cyclically step by step from channel to channel. This shifting is illustrated for the first and second channel control signals shown in FIGS. $3D_1$ and $3D_2$. The channel control signal generator 32 also includes another flip-flop circuit group 3215 which has four flip-flop circuit 3211, 3212, 3213, and 3214 driven stepwise by the "1" output of the fourth flip-flop circuit 3204 of the first binary group 3205. A second matrix 3216 responsive to all those outputs of the second flip-flop circuit group 3215 which have periods of 32, 64, 128, 256 channel intervals, is provided for formulating the logical products therebetween. Matrix 3216 has a group of sixteen output leads 3217 connected thereto which receive outputs having a repetition period of 256 channel intervals and a duration of sixteen channel intervals. These outputs are shifted cyclically by sixteen channel intervals. A third matrix 3220 is connected to receive and be responsive to the outputs of the first and the second matrices 3206 and 3216 for formulating the logical products therebetween. Matrix 3220 has 241 channel control signal output leads $32_1$ through $32_{241}$ connected thereto. The signals supplied to these leads have a repetition frequency of eight kilocycles or a repetition period of 241 channel intervals which have a duration of four bit intervals $4T_0$ and which are shifted cyclically from one another by one channel interval. The first, second, 240th, and 241st channel control signals (which appear on correspondingly numbered leads $32n$) are shown in FIGS. $3D_1$, $3D_2$, $3D_{240}$, and $3D_{241}$, respectively.

In further explaining the operation of the above-described portion of the channel control signal generator 32, it be assumed that initially the first and second flip-flop circuit groups 3205 and 3215 are all reset so that the "0" and the "1" outputs are the "0" and the "1" states, respectively. When a pulse of the channel timing signal B (hereafter called the first channel timing pulse) reaches the channel control signal generator 32, the leading edge thereof triggers only the first flip-flop circuit 3201 of the first group so that the "0" and the "1" outputs thereof are reversed to the "1" and the "0" states, respectively. These "0" and "1" outputs of this flip-flop circuit 3201, after having been in these states for eight bit intervals (or one channel intervals), are reset by the leading edge of the next channel timing signal pulse B (hereafter called the second channel timing pulse) to the initial "0" and "1" states, respectively. Flip-flop 3201 is thereafter cycled by pulses B to set and reset at a period of two channel intervals. Inasmuch as the second through the fourth flip-flop circuits 3202–3204 of the first group are set at the moment when the "1" output of the preceding flip-flop circuit returns from the "0" to the "1" state, the "0" and the "1" outputs of these flip-flop circuits 3202–3204 are reversed at the time of arrival of the second, the fourth and the eighth channel timing pulses, respectively, and alternatingly assume the "1" and the "0" states at periods of four, eight, and sixteen channel intervals, respectively. It follows therefore that upon arrival of the sixteenth channel timing pulse, the first flip-flop circuit group 3205 is reset to the initial state and will thereafter continue to cycle as the successive channel timing pulses B are supplied thereto. Therefore, the overall state of all the outputs of the first flip-flop circuit group 3205 and the channel timing signal B, to which the first matrix 3206 responds, will be unchanged for ½ a channel interval in accordance with the channel timing signal B and will never assume the same state within a duration of sixteen channel intervals. It will, however, assume for ½ a channel interval the same state that was assumed sixteen channel intervals before. Inasmuch as the logical product circuits of the first matrix 3206 are arranged to produce their respective outputs only when they are supplied with particular combinations of inputs, respectively, the first matrix 3206 delivers to sixteen output leads of the first group 3207 those pulse trains, respectively, which have a common repetition period of sixteen channel intervals and assume the "1" state for ½ a channel interval (or four bit intervals $4T_0$) but have the time of transition from the "0" to the "1" state shifted from one another by one channel interval. The pulses on the first through the sixteenth output leads 3207 coincide with the leading edges of the first through the sixteenth, or the seventeenth through the thirty-second, . . ., or the $(16n+1)$th through the $[16(n+1)]$th ones of the channel timing signal pulses B, respectively.

The first flip-flop circuit 3211 of the second group is not set until the "1" output of the fourth flip-flop circuit 3204 of the first group is reversed from the "0" to the "1" state (or until the appearance of the leading edge of the sixteenth channel timing signal pulses B). Therefore, the "0" and the "1" outputs of this flip-flop circuit 3211 alternatingly repeat the "1" and the "0" states at a period of thirty-two channel intervals. Likewise, the outputs of the second through the fourth flip-flop circuits 3212–3214 of the second group vary at the periods of 64, 128 and 256 channel intervals. In this manner, the second flip-flop circuit group 3215 returns to the initial state every 256 or $16^2$ channel intervals. Consequently, the overall state of all outputs of the second flip-flop circuit group 3215 cycles once for every sixteen channel intervals. Thus, the second matrix 3216 supplied with the outputs from flip-flop 3215 outputs delivers to the first output lead of group 3217 an output which is in the "1" state from the beginning of operation or the time of reset until appearance of the leading edge of the sixteenth channel timing signal pulses B. The matrix supplies the second lead of group 3217 an output which switches from the "0" to the "1" state upon application of the leading edge of the sixteenth channel timing pulse and remains in the "1" state for sixteen channel intervals. The third through the sixteenth output leads are supplied similarly with outputs from the matrix and each is in the "1" state for different sixteen channel intervals.

One set of logical circuits (not shown) contained in the first matrix 3220 transmits (while the pulse on the first output lead of the lead group 3217 is in the "1" state) the pulses on the first through the fifteenth output leads of the first group 3207 to the first through the fifteenth channel control signal output leads $32_1$–$32_{15}$, respectively, as the first through the fifteenth channel control signals $D_1$–$D_{15}$. Therefore, the first pulse of the first channel control signal $D_1$ is the same as the first pulse on the first output lead of the first group 3207 (or a pulse which has the leading edge at the time of the leading edge of the first one of the channel timing pulses B and which assumes the "1" state for four bit intervals $4T_0$). The first pulse of the second channel control signal $D_2$ is the same as the first pulse on the second output lead of the first group 3207; etc. After the first pulse on the fifteenth output lead of the first group 3207 has been delivered as the first pulse of the fifteenth channel control signal $D_{15}$, the output of the first output lead of the second group 3217 returns to the "0" state and the output of the second output lead of the second group 3217 turns to and remains in the "1" state for the sixteen channel intervals. During this time, stage 3205 cycles again to provide outputs to the first group 3207 which are transferred to the sixteenth through the thirty-first channel control signal output leads $32_{16}$–$32_{31}$, respectively, as the sixteenth through the thirty-first channel control signals $D_{16}$–$D_{31}$. In this manner, the cyclic output produced on the sixteen output leads of the first group 3206 are controlled in the third matrix 3220 by the outputs on the second output leads 3217 to provide the 240 channel control signals $D_1$–$D_{240}$.

One channel interval after production of the 240th channel control signal $D_{240}$ shown in FIG. $3D_{240}$, a pulse control signal $D_{241}$ is produced on the 241st output lead $32_{241}$ of the third matrix 3220 in response to the output on the second output lead of the first group 3207. This control signal $D_{241}$ is transformed (by a conventional delay device 3221 to provide a five-bit-interval delay) into a frame synchronizing pulse control pulse E shown in FIG. 3 which appears on frame synchronizing pulse control pulse output lead 3222. This control pulse E is also supplied as a reset pulse to all the flip-flop circuits of the first and the second groups 3205 and 3215, to reset them into their respective initial states. The channel control signal generator 32 repeats its previous operation as soon as the next channel timing pulse B appears (after the flip-flop circuits 3205 and 3215 have been reset). As a result, the first through 240th channel control signals $D_1$–$D_{240}$ appear successively on the first through the 240th channel control signal output leads $32_1$–$32_{240}$, respectively, (which have a common repetition period of 241 channel intervals of 125 microseconds and common duration of four bit intervals). These outputs are shifted consecutively from channel to channel except for the first channel control signal $D_1$ which is shifted from the 240th channel control signal $D_{240}$ by two channel intervals.

The sampler 31 samples (with the aid of the supplied first through 240th channel control signals $D_1$–$D_{240}$) the voice signals supplied from channels CH1–CH240. The voice signal of any one channel is sampled once every 125 microseconds or at a repetition frequency of eight kilocycles. At the same time, sampler 31 arranges the sampled signals into a PAM pulse train. In this regard, it is to be noted that no PAM pulse is present during one channel interval between the PAM pulse of the 240th channel and the succeeding PAM pulse of the first channel.

The encoder 33 may be any of many known circuits, one such circuit is described in "Proceedings of the I.R.E.," August 1953 issue, pp. 1053–1058. In the embodiment of FIG. 2, it is to be understood that the time required for quantizing and encoding a channel information PAM pulse train into the PCM channel information pulse train shown in FIG. 3F, is one channel interval. Thus, the leading edges of the time intervals assigned to the respective PCM channel information pulse groups lag behind the leading edges of the pulses of the corresponding channel control signals by one channel interval. Incidentally, the hatched portions in FIG. 3F illustrate pulses which assume either the "0" and the "1" states according to the level of the corresponding PAM pulse.

The frame synchronizing pulse generator 36 of FIG. 2 includes: a two-input AND gate 361 which is supplied with the channel timing signal B and the frame synchronizing pulse control pulse train E; and a monostable multivibrator 362 for producing a pulse which lasts seven bit intervals. The output of multivibrator 362 is a train of frame synchronizing pulses which are supplied to output lead 363 as frame synchronizing pulse groups G. Each pulse of group G consists of a wide pulse whose leading edge lags by one channel interval $T_0$ behind the leading edge of the time interval assigned to the 240th channel information pulse groups and is in the "1" state for seven bit intervals.

The synchronizing signal interposer 37 of FIG. 2 has a three-input OR gate 371 which is supplied with the PCM channel information pulse train F, the frame synchronizing pulse groups G, and the channel synchronizing "1" pulses C and is adapted to produce the PCM pulse train H in response to the supplied pulses.

Figure 4:
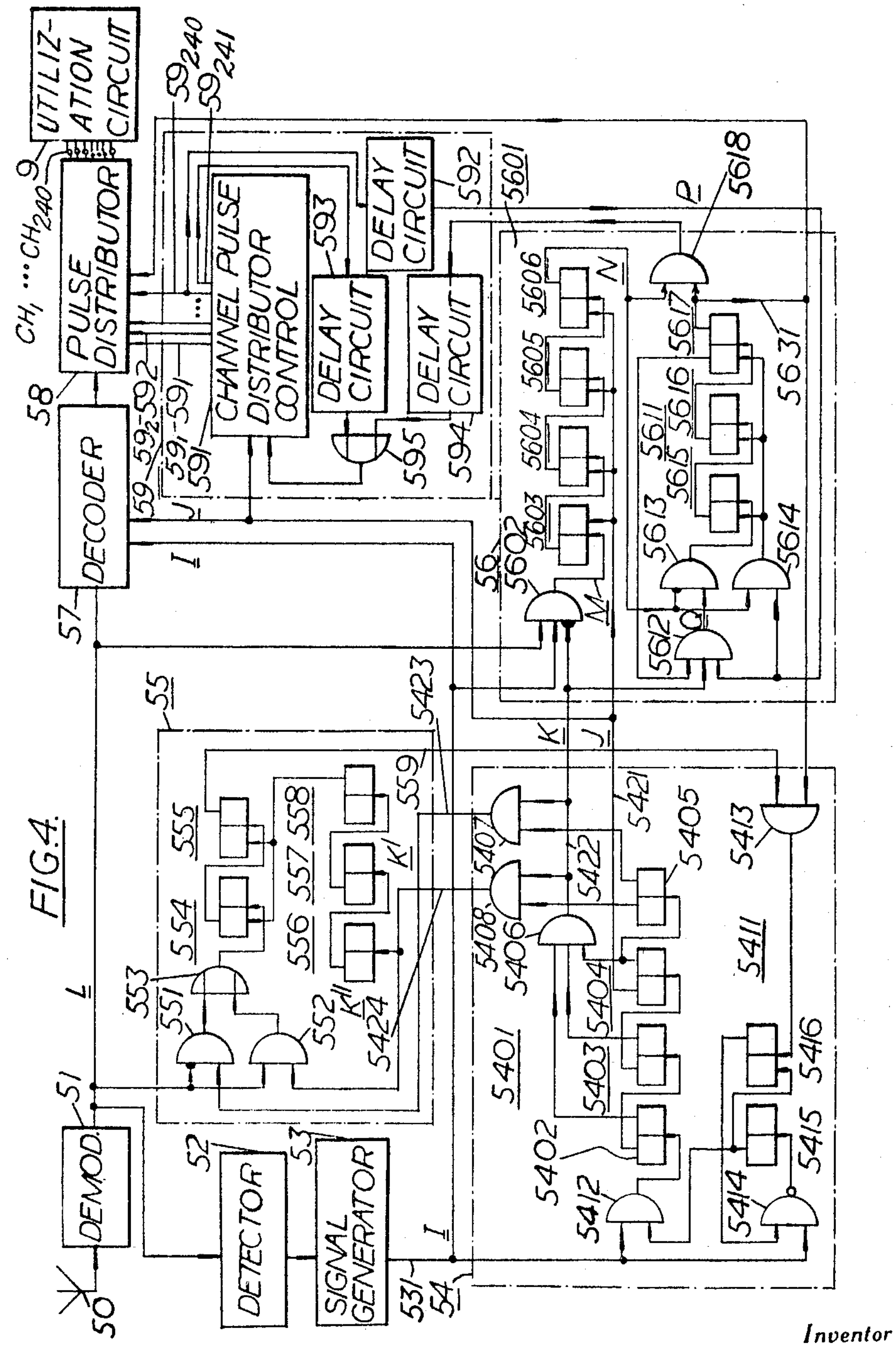
FIG. 4 shows a circuit diagram, partly in block form, of a time-division multiplexed PCM wireless receiver which includes the novel synchronizing system of this invention.

Next referring to FIG. 4, there is illustrated a receiver for use in the time-division multiplexed PCM communication system of this invention. The receiver receives the time-division multiplexed PCM signals transmitted from the previously described transmitter by means of an antenna 50 and demodulates the thus received high-frequency signals at a demodulator 51. The demodulated signal or a time-division multiplexed PCM pulse train L (shown in FIG. 5) is partly supplied to a bit timing frequency detector 52 for extracting the bit timing frequency component therefrom. The bit timing frequency compoment is used to control the frequency and the phase of the output oscillations produced by a bit timing signal generator 53 to form a train of bit timing signals I which are in perfect synchronism with the bit positions in the received and demodulated time-division multiplexed PCM pulse train L. The bit timing signal I is supplied to a channel timing signal-inter-channel pulse-and-channel synchronism reference pulse generator 54 (hereafter called a channel synchronizing signal generator). Generator 54 in response to the bit timing signal I generates a channel timing signal J; an inter-channel pulse train K consisting of pulses which have leading edges one bit interval $T_0$ preceding the leading edges of the channel timing signal J, and a common duration of one bit interval $T_0$, and a repetition period of eight bit intervals $8T_0$ (and which appear, if the channel synchronism is in order, between adjacent channel information pulse groups and between the frame synchronizing pulse group and the adjacent channel information pulse groups); and first and second channel reference pulse trains K′ and K″ each of which has twice as long a repetition period as the inter-channel pulse train K and which correspond to the channel synchronizing "1" pulse train C illustrated in FIG. 3 and a pulse train of the opposite phase, respectively. The channel synchronism reference pulse trains K′ and K″ are supplied together with the received PCM pulse train L to a channel synchronism error signal generator 55, which compares the two channel synchronism reference pulses K′ and K″ with the received PCM pulses L.

When the results of comparison show that the probability of the channel synchronism being maintained is very small, a channel synchronism error signal is produced. However, no channel synchronism error signal is produced when the probability of synchronism is very great and it is determined that the channel synchronism is maintained. More particularly, if the leading edges of the pulses of the channel timing signal J are in coincidence with the beginnings of the time intervals assigned to the frame synchronizing pulse groups and the channel information pulse groups in the received PCM pulse train L, then the probability of synchronism will be very good. The channel synchronism error signal is supplied to the channel synchronizing signal generator 54 which shifts the leading edges of the respective pulses of the channel timing signal J and the first and the second channel synchronism reference pulse trains K′ and K″ by a bit interval $T_0$, when a frame synchronism error signal is also supplied thereto. The shifted first and the second channel synchronism reference pulses K′ and K″ are compared with the received PCM pulse train L and the operation is repeated until the channel synchronism is eventually brought into order. In this manner, the four types of output pulses J, K, K′, and K″ of the channel synchronizing signal generator 54 are synchronized within a short duration of time with the received PCM pulse train L. The channel timing signal J and the inter-channel pulse train K (which are in perfect channel synchronism) and the bit timing signal I (which is in bit synchronism) are supplied to a frame synchronism error signal-and-channel control signal reset pulse generator 56 (hereafter called a frame synchronism error signal generator). Generator 56 monitors the received PCM pulse train L and produces one pulse of the frame synchronism detection pulse train N only upon reception of each frame synchronizing pulse group or each combination of seven "1" pulses from the beginning of the time interval assigned to the seven-digit code elements in the received PCM pulse train L.

Meanwhile, the received PCM pulse train L is also supplied together with the bit and the channel timing signals I and J which are already in bit and channel synchronism to a decoder 57 where each seven-digit code element group contained in the received PCM pulse train L is decoded in a conventional manner into an analogue voltage corresponding to the code combination. Thus, the received PCM pulse train L ( or the time-division multiplexed PCM pulse train L) is transformed after a delay (in this embodiment, $8T_0$) required for decoding, into a time-division multiplexed PAM pulse train, which is supplied to pulse distributor 58 where the PAM channel information pulses contained in the PAM pulse train are distributed to the respective channels of a utilization circuit 9 under control of channel distribution signals $O_1$–$O_{240}$ supplied from channel distribution signal-and-frame synchronism reference pulse generator 59 (hereinafter called a channel distribution signal control generator). In order to insure correct distribution, frame synchronism must be maintained between the PAM pulses and the channel distribution signals $O_1$–$O_{240}$. More particularly, when each analogue voltage of the first channel in the PAM pulse train is supplied to the distributor 58, the channel distribution signal $O_1$ of the first channel must simultaneously be supplied thereto. The same operation must be maintained for the second and the subsequent channels. Therefore, in order to insure correct distribution of the decoded information to the respective channels in utilization means 9 (even if frame synchronism is not present and a frame synchronism error signal is present in the manner to be later described) one of the pulses of the frame synchronism detection pulses N (produced in the frame synchronism error signal generator 56 as a result of detection of a frame synchronizing pulse group) can be supplied by itself as a channel distribution signal reset pulse to the channel distribution signal generator 59 to reset all the circuit components which are contained therein (and which are concerned with production of the channel distribution signals $O_1$–$O_{240}$). After the eight bit interval $8T_0$ required after reset (for decoding performed at the decoder 57) the channel distribution signal generator 59 begins to produce the first-channel and the following channel distribution signals $O_1$–$O_{240}$ in cyclic succession. The channel distribution signals $O_1$–$O_{240}$ will thus be supplied to the distribution 58 in coincidence with the respective channel analogue signals and frame synchronism may thus be restored.

The operation of FIG. 4 will now be explained briefly in conjunction with FIG. 5 to illustrate the monitoring of frame synchronism or for detecting any loss of frame synchronism or how the system responds to produce a frame synchronism error signal which is used to restore and confirm restoration of frame synchronism. The channel distribution signal generator 59 produces by means of the 240th channel distribution signal $O_{240}$ a frame synchronism reference pulse train P within the time interval allotted to the 240th channel. If the channel distribution signals $O_1$–$O_{240}$ and the received PCM pulse train L are in frame synchronism, the frame synchronism reference pulses P would appear every time the frame synchronising pulse groups in the received PCM pulse train L are delivered to the output terminal of the demodulator 51. These frame synchronism reference pulses P are supplied to the frame synchronism error signal generator 56 and are compared with the respective frame synchronism detection pulses N. Every time pulses P and N coincide, the frame synchronism is judged to be in order and no frame synchronism error pulse is produced. However, if frame synchronism reference pulses P do not appear simultaneously with the frame synchronism detection pulses N, the frame synchronism error signal generator 56 begins to count the frequency or number of times these pulses do not appear in coincidence. Thus, each time the number being counted reached a predetermined value U (in this embodiment, $U=4$), the frame synchronism is deemed to be lost and the frame synchronism error signal generator 56 produces a frame synchronism error signal. This initiates, the above-mentioned frame synchronism restoration operation. At the same time, the frame synchronism error signal is supplied to the distributor 58 to suspend transmission of the demodulated voice signals to the respective channels. After frame synchronism has been restored, the first frame synchronism reference pulses P (which is produced 125 microseconds after the reset of the channel distribution signal generator 59) is compared with the corresponding pulse of the frame synchronism detection pulses N. If these pulses are found to coincide, this confirms restoration of frame synchronism and the further production of the frame synchronism error signal is terminated. As a result, the channel distribution signal reset pulse is no longer produced and the operation of the receiver returns to normal, and the distribution of the voice signals from the distributor 58 to the respective channels resumes.

The above-mentioned predetermined value U which serves to avoid spurious detection of loss of synchronism, is determined in the following manner. The bit timing signal generators of the transmitter and the receiver (as explained hereinabove) have been described as oscillators which have excellent frequency stability (such as a quartz-crystal controlled oscillator having a frequency stability of $5\times10^{-5}$ which can be readily obtained using known techniques). Inasmuch as the frequency of the bit timing signal A or I is about 15.4 mc. in the embodiment, the range of frequency shift is about 765 cycles. Therefore, if the oscillators in the transmitter and the receiver are set into operation independently of each other, there is a minimum time interval of about 650 microseconds (or the reciprocal of twice 765 cycles) between the time the phases of the bit timing signals A and I (which serves as the basis of the operation of the transmitter and the receiver) are in complete phase coincidence and the time they are entirely out of synchronism. Thus, even if the link between the transmitter and the receiver is interrupted by an instantaneous interruption of the wireless transmission path, correct synchronism can be maintained between the transmitter and the receiver for at least 650 microseconds from the instant the interruption occurred. The frame synchronism reference pulses P frequently do not reach the frame synchronism error signal generator 56 in coincidence with the frame synchronism detection pulses N produced therein. Such a situation arises when the instantaneous interruptions of the transmission path are caused by fading (which frequently occurs in wireless transmission paths) or when a frame synchronizing pulse group reaches the receiver which contains the code combination of the frame synchronizing pulse group as a result of increased noise due to the decrease in the input power before and after the instantaneous interruption. Even if pulse trains P and N do not reach generator 56 in coincidence, production of a frame synchronism error signal is not desirable in these cases, because it initiates synchronism restoration operation where in fact synchronism is in fine order and either a false synchronizing pulse group is received or the instantaneous interruption lasts less than 650 microseconds. Therefore, a frame synchronism error signal must not be produced until the number of times the frame synchronism reference pulses P and the frame synchronism detection pulses N do not coincide, reaches the predetermined number U which in this case should be five (because 650 microseconds correspond to about five frame intervals). With this embodiment, four is selected for the value U in order to increase the reliability of operation. Thus, it is possible to confirm loss of frame synchronism correctly with the maximum possible rapidity.

Figure 5:
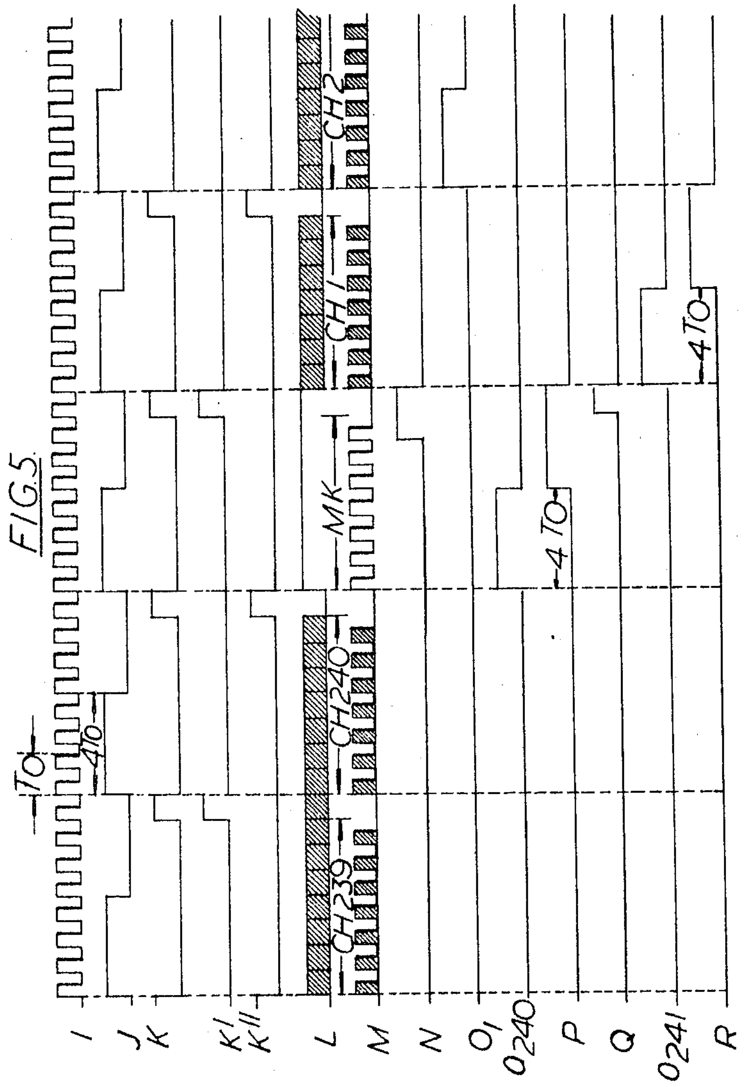
FIG. 5 illustrates waveforms obtained during the operation of the receiver illustrated in FIG. 4.

Continuing to refer further to FIGS. 4 and 5, the bit timing frequency detector 52 will include a bandpass filter (not shown) whose center frequency is the bit timing frequency such as 15.424 megacycles and extracts from the received PCM pulse train L a signal of the bit frequency. The bit timing signal generator 53 may include an oscillator of 15.424 megacycles (not shown) and an automatic phase controller (not shown) for controlling the output of the oscillator with the output of the bit timing frequency detector 52 so that the oscillator output competely coincides in frequency and phase with the bit positions in the received PCM pulse train L. Timing generator 53 provides lead 531 with the bit timing signal I which is in complete synchronism with the bit positions in the received PCM pulse train L.

The channel synchronizing signal generator 54 includes: a channel synchronizing signal generating portion 5401 which in turn comprises four flip-flop circuits 5402, 5403, 5404, 5405, and AND gates 5406, 5407 and 5408. Portion 5401 produces, in response to the supplied bit timing signal I, the channel timing signal J, the interchannel pulse train K, and the first and the second channel synchronism reference pulse trains K′ and K″. Generator 54 also includes a channel synchronism adjusting portion 5411 which in turn comprises AND gates 5412 and 5413, and AND-NOT gate 5414, and flip-flop circuits 5415 and 5416. Portion 5411 shifts by one bit interval (in response to the bit timing signal I and the channel and the frame synchronism error signals), the leading edge of each pulse of the above-mentioned four output signals of the channel synchronizing signal generating portion 5401. In operating the channel synchronizing signal generating portion 5401, the bit timing signal I is supplied through the bit timing signal output lead 531 and the AND gate 5412 (which is normally open) to the first flip-flop circuit 5402 and supplies from the "1" output of flip-flop circuit 5402 to the second flip-flop circuit 5403 a pulse series whose repetition period is two bit intervals $2T_0$. That "1" output of flip-flop circuit 5403 (which has a repetition period of four bit intervals $4T_0$) is now supplied to the third flip-flop circuit 5404 which supplies to lead 5421 from the "1" output thereof the channel timing signal J which has a repetition period of eight bit intervals $8T_0$ (or one channel interval) and consists of pulses of a common duration of four bit intervals $4T_0$. Those three "0" outputs of the first through the third flip-flop circuits 5402–5404 are applied to three input AND-gate 5406 that have repetition periods of $2T_0$, $4T_0$, and $8T_0$, respectively, and have reversed phases with respect to the corresponding "1" outputs. Thus, the AND gate 5406 delivers to an inter-channel pulse output lead 5422 the inter-channel pulses K which have: a repetition period of $8T_0$, duration of $T_0$, and leading edges preceding by a time $T_0$ the leading edges of the pulses of the channel timing signal J. This inter-channel pulse train K is also supplied to the two-input AND gates 5407 and 5408 to which the "0" and "1" outputs of the fourth flip-flop circuits 5405 (driven by the "0" output of the third flip-flop circuit 5404) are supplied as the other respective inputs and which have: a repetition period of $16T_0$, a common duration of $8T_0$, and opposite phase with respect to each other. These AND gates 5407 and 5408 therefore deliver to channel synchronism reference pulse output leads 5423 and 5424 the first and the second channel synchronism reference pulse trains K′ and K″, respectively, whose pulses have a common repetition period of $16T_0$ (or two channel intervals) and a common duration of $T_0$ and are shifted from each other by one channel interval. If the channel synchronism is in order, pulses of pulse train K′ coincide with (and pulses of the pulse train K″ have a reversed phase with respect to) the channel synchronizing "1" pulses contained in the received PCM pulse train L.

The channel synchronism error signal generator 55 includes: a NOT-AND gate 551 which is supplied with the received PCM pulse train L at the inhibit input and with the first channel synchronism reference pulse train K′; and AND gate 552 which is supplied with the received PCM pulse train L and the second channel synchronism reference pulse train K″; and an OR gate 553, connected to receive the outputs from gates 551 and 552. These gates monitor the channel synchronism by comparing the received PCM pulse train L with the two channel synchronism reference pulse train K′ and K″. Flip-flop circuits 554 and 555 are provided for producing a channel synchronism error signal when the result of the monitoring shows that channel synchronism has been lost. The three flip-flop circuits 556, 557, and 558 are provided for supplying reset pulses to the binary two flip-flop circuits 554 and 555 at a repetition period of $16T_0$ to thereby stop production of the channel synchronism error signal. The output of the NOT-AND gate 551 assumes the "1" state only when the received PCM pulse train L assumes the "0" state at each of the time points (where if the channel synchronism is in order) the channel synchronizing pulses in the received PCM pulse train L should be in the "1" state. The output of the AND gate 552 assumes the "1" state only when the received PCM pulse train assumes the "1" state at each of the time points at which the channel synchronizing pulses should be in the "0" state. Therefore, the output of the OR gate 553 which delivers either of the outputs of the NOT-AND and the AND gates 551 and 552, is an out-of-channel-synchronism indicating pulse which assumes the "1" state only when the actual state assumed by the received PCM pulse train L (at each of the time points at which the channel synchronizing pulses are assumed to appear) does not coincide with the presumed state of the channel synchronizing pulses. If the channel synchronism is in order, or in other words, if the first channel synchronism reference pulses K′ are produced in coincidence with the time points of arrival of the channel synchronizing "1" pulses in the received PCM pulse train L, then the probability of occurrence of the out-of-channel-synchronism indicating pulse is very small. The probability increases, however, if channel synchronism is lost. The out-of-channel-synchronism indicating pulse is supplied to the flip-flop circuit 554. Inasmuch as the "1" output of the flip-flop circuit 554 drives the next flip-flop circuit 555, the second out-of-channel-synchronism indicating pulse, if produced, will drive the "0" output of the flip-flop circuit 555 to the "1" state. Meanwhile, the three flip flop circuits 556–558 count the second channel synchronism reference pulses K″ to reset the flip-flop circuits 554 and 555 by utilizing the "0" output of the last third-stage flip-flop circuit 558. It will now be understood that the flip-flop circuits 554 and 555 are reset at a repetition period of sixteen channel intervals (because the channel synchronism reference pulses K′ and K″ are produced at a common repetition period of two channel intervals) and that if at least two out-of-channel-synchronism indicating pulses are produced within the sixteen channel intervals, the "0" output of the flip-flop circuit 555 turns to the "1" state, which will be delivered to the channel synchronism error signal output lead 559 as the channel synchronism error signal pulse.

Referring again to the channel synchronizing pulse generator 54, the operation of the channel synchronism adjusting portion 5411 begins only when both the channel synchronism and the frame synchronism error signals are present. With this type operation it is not necessary to initiate the channel synchronism restoration operation even though a channel synchronism error signal pulse may be produced, in response to noise in the transmission path etc., since in fact the frame synchronism is in order. In the channel synchronism adjusting portion 5411, the AND gate 5413 produces a "1" output to drive the flip-flop circuit 5416 only when a channel synchronism error signal and a frame synchronism error signal are simultaneously present on leads 559 and 5631 respectively. When they are present, the "0" output of flip-flop circuit 5416 assumes the "1" state and this output is supplied as one of the inputs to the AND-NOT gate 5414. As a result, the output of the AND-NOT gate 5414 to which the bit timing signal I is supplied as the other input, switches from the "1" state to the "0" state, when the leading edge of a pulse of the bit timing signal I appears (when the "0" output of flip-flop circuit 5416 switches from the "0" to the "1" state and then switches back to the one state at the other time point when the trailing edge of the same pulse appears). The "1" output of flip-flop circuit 5415 (which is driven by the output of the AND-NOT gate 5414) switches to the "0" state when the output of the AND-NOT gate 5414 returns from the "0" to the "1" state. The AND gate 5412 (which is supplied with "1" output of the flip-flop circuit 5415 which output is normally in the "1" state) is open in the normal operating state thereof to let the bit timing signal I pass therethrough; but is closed when the "1" output of flip-flop circuit 5415 switches to the "0" state to inhibit passage of the next pulse of the bit timing signal I (when counted from the pulse thereof which appeared upon closure of AND gate 5412 or that has driven the flip-flop circuit 5415).

Meanwhile, the trailing edge of the next or second pulse drives flip-flop circuit 5415 to cause the "1" output thereof to return to the "1" state. As a result AND gate 5412 again opens to allow the bit timing signal I to pass therethrough. The "1" output of flip-flop circuit 5415 is also supplied at the reset pulse to flip-flop circuit 5416 so that the "1" output of the former (upon returning from the "0" to the "1" state) can reset flip-flop circuit 5416 to cause the "0" output thereof to return to the "0" state. In this manner the channel synchronism adjusting portion 5411 prevents (after a pulse of the bit timing signal I has set it into operation) the second pulse thereof from being delivered to the channel synchronizing signal generating portion 5401. Adjusting portion 5411 then returns to the normal unoperated state thereof in response to the trailing edge of this second pulse of the bit timing signal I. Since a pulse of the bit timing signal I supplied to the channel synchronizing signal generating portion 5401 has been omitted, the leading edges of the four output signals of portion 5401 are delayed by one bit interval $T_0$ as compared with the time points at which the leading edges should normally appear. Of these four output signals, the channel synchronism reference pulse trains K′ and K″ are again compared in generator 55 with the channel synchronizing pulses in the received PCM pulse train L. In this manner, each of the leading edges of the four outputs from the channel synchronizing signal generator 54 is shifted by one bit interval $T_0$ (a maximum of 15 times) until channel synchronism is re-established and the channel synchronism error signal disappears. The time relation of the received PCM pulse train L and the four outputs J, K, K′ and K″ of the channel synchronizing signal generator 54 after the channel synchronism has been established are illustrated in FIG. 5, wherein the hatched portions indicates those pulses which assume either the "0" or the "1" state according to the voice signals of the channels transmitted from the transmitter.

The time required for the synchronizing system to restore the channel synchronism is very short. The time necessary for detecting any loss of channel synchronism (that is, the time interval between the time of actual loss of synchronism or the time point at which a pulse of the received channel synchronizing pulses is no longer coincident with a pulse of the first channel synchronism reference pulses K' and the time of production of a channel synchronism error signal) is equal to the time interval from the loss of channel synchronism until production of the second out-of-channel-synchronism indicating pulse. This is so because the channel synchronism error signal appears concurrently with the second out-of-channel-synchronism indicating pulse. This time interval, although dependent on the state of the channel information pulse groups, does not exceed two sampling intervals as has been mentioned heretofore. Inasmuch as the time needed for shifting the pulses of the first and the second channel synchronism reference pulse trains K' and K" is only ten bit intervals at the longest, it requires only a maximum of 251 microseconds (from the time of loss of channel synchronism) for the completion of the one-bit shifting of the channel synchronism reference pulse trains K' and K". The time further required for restoring the channel synchronism (although dependent on the number of bits for the channel synchronism reference pulse trains K' and K" must be shifted) is only 3.8 milliseconds even if the number of shifts is the maximum of fifteen bits. In this connection it is to be noted that the probability that such a long restoration time will be required is very small.

Continuing to refer to FIG. 4, the frame synchronism error signal generator 56 includes: a frame synchronism detecting portion 5601 which continuously monitors the received PCM pulse train L to produce frame synchronism detection pulses N only when frame synchronizing pulse groups are received. Detecting portion 5601 includes a three-input AND gate 5602 having an inhibit input, and four flip-flop circuits 5603, 5604, 5605, 5606. Generator 56 further includes: a frame synchronism monitoring portion 5611, which continuously compares the frame synchronism detection pulses N with those pulses produced in the receiver which are presumed to correspond in time to the frame synchronizing pulse groups. Portion 5611 monitors the frame synchronism between the transmitter and the receiver and produces when frame synchronism has been lost (and this fact has been confirmed), a frame synchronism error signal. Position 5611 comprises three-input AND gate 5612, a NOT-AND gate 5613, a two-input AND gate 5614, three flip-flop circuits 5615, 5616, and 5617, and another two-input AND gate 5618.

During the operation of the frame synchronism detecting portion 5601, the three-input AND gate 5602 receives the inter-channel pulses K at the inhibit input thereof. The received PCM pulse train L and the bit timing signal I are the remaining inputs to gate 5602. Consequently, the output of AND gate 5602 is a narrow pulse train M consisting of all those "1" pulses in the received PCM pulse train L which are not coincident with the channel synchronizing pulses and which are compressed to the former halves of the time intervals of their duration. The narrow pulse train M is then counted by the four flip-flop circuits 5603–5606. Inasmuch as each leading edge of the channel timing signal pulses J sets flip-flop circuit 5603 and resets the remaining flip-flop circuits 5604, 5605, and 5606, the last-stage flip-flop circuit 5606 produces at its "0" output (in response to the frame synchronizing pulse group which is a combination of seven "1" pulses) the frame synchronism detection pulse train N consisting of pulses, each of which assumes the "1" state for two bit intervals $2T_0$ at the end of the time interval assigned to each frame synchronizing pulse group. It is to be recalled in this connection that only the frame synchronizing pulse group (and none of the channel information pulse groups) has seven successive "1" pulses in the received PCM pulse train L. Consequently, the frame synchronism detection pulses N are produced at a repetition period of a frame interval (or the sampling period within the time interval of arrival of a frame synchronizing pulse group) and are supplied to the frame synchronism monitoring portoon 5611. Assume, now, that the loss of frame synchronism has been confirmed and a frame synchronism error signal has been produced by the frame synchronism monitoring portion 5611 (whose operation hereinafter will be described in detail). Then, AND gate 5618 to which pulses N and the frame synchronism error signal are supplied, is open to allow one pulse of the pulse train N, pass therethrough to the channel distribution signal generator 59, as a channel distribution signal reset pulse.

The channel distribution signal generator 59 includes: a channel distribution signal generating portion 591 which has the same construction and function as the channel synchronizing signal generator 32 on the transmitter side shown in FIG. 3 (except for delay device 3221 and the frame synchronizing pulse control pulse output lead 3222). Portion 591 is driven and reset respectively by the channel timing signal J and the output of an OR gate 595 (which will be described hereinafter) in a similar manner to the transmitter channel control signal generator 32. Portion 591 delivers to output leads $59_1$–$59_{241}$ the channel distribution signals and the additional signals $O_1$–$O_{241}$ (corresponding to the transmitter channel control signals $D_1$–$D_{241}$) respectively. Delay devices 592 and 593 are supplied with the 240th and the 241st channel distribution signals $O_{240}$ and $O_{241}$, respectively, and respectively delay these signals by four bit intervals $4T_0$. A delay device 594 is supplied with the channel distribution signal reset pulse for delaying the pulse by six bit intervals $6T_0$. The OR gate 595 is provided for delivering the outputs of the delay devices 593 and 594 to the channel distribution signal generating portion 591 as the reset pulse.

It will again be assumed that the loss of frame synchronism has been confirmed and that the frame synchronism error signal is present. The following description will illustrate how restoration of frame synchronism is achieved in the channel distribtuion signal generator 59 subsequent to production of the error signal. At the moment when frame synchronism is lost, the PAM pulse train derived from the received PCM pulse train L at the decoder 57 (with a delay of eight bit intervals $8T_0$) will not be distributed by the distributor 58 to the respective channels. The voice signals are not sent to the wrong channels CH1–CH240 because these signals are stopped by the frame synchronism error signal supplied to the distributor 58. A first frame synchronizing pulse group (received after occurrence of a frame synchronism error signal) causes a pulse of the frame synchronism detection pulses N to appear on the output side of the AND gate 5618 as a channel distribution signal reset pulse, when the distributor 58 is supplied with a PAM channel information pulse of the 240th channel which precedes the frame synchronizing pulse group by one channel interval. The channel distribution signal reset pulse is supplied to both the delay device 594 (where it undergoes a delay of $6T_0$) and through OR gate 595 to reset the channel distribution signal generating portion 591. The PAM pulse supplied at that instant to the distributor 58 is the frame synchronizing pulse group which has been decoded at decoder 57. The reset channel distribution signal generating portion 591 is again driven by the channel timing signal J to produce the first-channel channel distribution signal $O_1$ in coincidence with the leading edge of a first pulse of signal J which appears after the reset. Inasmuch as the channel timing signal J has already been in channel synchronism, the PAM channel information pulse of the first channel is supplied to the distributor 58 simultaneously with the first-channel channel distribution signal $O_1$. In this manner, the frame synchronism of the channel distribution signals $O_1$–$O_{241}$ are brought into order and they are now in a position to duly distribute the PAM channel information pulses to the respective channels. It is to be noted, however, that the frame synchronism error signal is still present to prevent actual transmission of the voice signals to the respective channels. the 240th channel channel distribution signal $O_{240}$ which appeared as the 240th channel distribution pulse (after the reset of the channel distribution signal generating portion 591 and supplied to the 240th output lead 59$_{240}$) is also delivered to the delay device 592 and undergoes a delay of $4T_0$. If the channel distribution signal generating portion 591 is already in frame synchronism, a pulse of frame synchronism reference pulses P (which are the output pulses of the delay device 592) will coincide with that frame synchronizing pulse group (in the received PCM pulse train L) which is received one frame interval after the frame synchronizing pulse group and will reset the channel distribution signal generating portion 591. Consequently, the same pulse train P will coincide with that pulse of the frame synchronism detection pulses N.

In the frame synchronism confirmation operation of the frame synchronism monitoring portion 5611, the two-input AND-gate 5614 is supplied with the frame synchronism reference pulses P and with the frame synchronism detection pulses N. If frame synchronism exists in the channel distribution signal generator 59, the P and N pulses coincide and the frame synchronism detection pulses N pass through the AND gate 5614. This operation confirms the restoration of the frame synchronism. That N pulse which has passed through the AND gate 5614 (which confirms the restoration of frame synchronism) also resets the flip-flop circuits 5615–5617 to restore the "0" output of the last-stage flip-flop circuit 5617 to the "0" state, which means that the frame synchronism error signal has been cancelled. When the frame synchronism error signal disappears, the distributor 58 begins to transmit the voice signals to the respective channels. Inasmuch as this transmission begins one frame interval after restoration of the frame synchronism, it is the voice signal of the first channel that is first transmitted. On the other hand, AND gate 5618 is closed to prevent the channel distribution signal reset pulse from passing therethrough to the channel distribution signal generator 59, thus preventing the resetting of the channel distribution signal generator 59 by a false frame synchronizing detection pulse which might be produced by a false frame synchronism pulse group resulting from the noise etc. After the restoration of frame synchronism has been confirmed, the 241st (or additional channel distribution signal $O_{241}$ on the output line 59$_{241}$ in the channel distribution signal generator 59) undergoes a delay of $4T_0$ at delay device 593 and then is supplied as reset pulse R through OR gate 595 to reset the channel distribution signal generating portion 591.

For ease of explanation, the operations of restoring frame synchronism and confirming the restoration were described first heretofore. However, to understand the entire operation of the system, an explanation will now be made of the detecting and confirming operations for the loss of frame synchronism (which operations precede in time the restoration and restoration-confirmation operation in the actual sequence of operation).

If frame synchronism exists, the channel distribution signal generator 59 produces and supplies the frame synchronism reference pulses P to the frame synchronism monitoring portion 5611 each time the frame synchronizing pulse group appears in the received PCM pulse train L at a repetition period of one frame interval. The reference pulses P are supplied not only to the two-input AND gate 5614 but also to the three-input AND gate 5612. Inasmuch as this AND gate 5612 is supplied with the "1" output of the flip-flop circuit 5617 (which is in the "1" state when frame synchronism exists) and with the inter-channel pulses K, it produces the pulses of a one-bit-interval pulse train Q at a repetition period of one frame interval during the bit intervals between the frame synchronizing pulse group and the first-channel channel information pulse group. The one-bit-interval pulse train Q is supplied as one of the inputs to the NOT-AND gate 5613, to which the frame synchronism detection pulses N are applied as the other, inhibit input. If frame synchronism exists, the respective pulses of the pulse trains Q and N coincide with each other whereby no output is produced from the NOT-AND gate 5613. If frame synchronism does not exist or the frame synchronizing pulse group does not appear (due to the instantaneous interruption of the transmission path etc.) the pulses of pulse trains Q and N are not coincident at NOT-AND gate 5613. As a result, the pulses of the one-bit-interval pulse train Q pass through the NOT-AND gate 5613 to drive the flip-flop circuit 5615. If the frame synchronism is still lost or if the path remains interrupted, the pulses of the one-bit-interval pulse train Q pass through the NOT-AND gate 5613 at a frame interval repetition period to successively drive the flip-flop circuits 5615–5617 until the leading edge of the fourth pulse of the one-bit-interval pulse train Q (counted from the first one that passed the NOT-AND gate 5613) reverses the last-stage flip-flop circuit 5617 to turn the "0" output thereof into the "1" state. Thus, a frame synchronism error signal will be sent to the frame synchronism error signal output lead 5631. If the transmission path is recovered etc., this will cause the frame synchronism reference pulse P and the frame synchronism detection pulse N to reach the AND gate 5614 in coincidence before production of the fourth pulse of the one-bit-interval pulse train Q. As a result, a frame synchronism detection pulse N will pass through the AND gate 5614 to immediately reset the flip-flop circuits 5615–5617 thereby preventing generation of a frame synchronism error signal. The time required for production of a frame synchronism error signal (after frame synchronism has actually been lost) is from three to four frame intervals although the actual time needed is dependent on the time of transmission of the first Q pulse through the NOT-AND gate 5613. Thus, even though isolated from the transmitter, the synchronizing system in the receiver will never erroneously detect a loss of synchronism provided the instantaneous interruption of the path has returned to normal within four frame intervals (during which interval the synchronizing system of this invention can maintain correct synchronism without producing any frame synchronism error signal). If the loss of synchronism or the instantaneous interruption lasts more than four frame intervals, the frame synchronism system of this invention becomes operative and the frame synchronism error signal appears. When the NOT-AND gate 5613 detects a loss of synchronism and the flip-flop circuits 5615–5617 have confirmed the loss of synchronism and produce a frame synchronism error signal, then the "1" output of the last-stage flip-flop circuit 5617 turns to the "0" state to close AND gate 5612 to avoid further switching of the flip-flop circuits 5615–5617 until frame synchronism is re-established. The frame synchronism error signal is also supplied through lead 5631 to distributor 58 to prevent the voice signals from being transmitted to the wrong channels. The frame synchronism error signal is also supplied to open AND gate 5413 to permit passage of the channel synchronism error signal therethrough to facilitate recovery of channel synchronism. The frame synchronism error signal is moreover delivered to open AND gate 5618 to allow a frame synchronism detection pulse N to reset the channel distribution signal generating portion 591.

To conclude the description of the synchronising system in the receiver, an example will be given hereinbelow to illustrate the short time required for confirming loss of frame synchronism and for restoring the frame synchronism according to this invention.

It will be recalled that the maximum time required between the actual occurrence of a frame synchronism disorder and the time of confirmation that this disorder to be a true one is four frame intervals or 0.5 millisecond. If the loss of frame synchronism is confirmed then the frame synchronism restoration operation will follow. If channel synchronism is also lost at the same instant, then the channel synchronism restoration operation will proceed first and the time required therefor will be, at most, 3.8 milliseconds. After the channel synchronism has been restored, the frame synchronism restoration operation will then follow. Frame synchronism restoration will require one frame interval or 125 microseconds at maximum. Subsequent to restoration of the frame synchronism, a time interval of one frame interval is necessary to confirm restoration of the frame synchronism. Over all, the maximum time required after confirmation of loss of the frame synchronism until complete recovery thereof, will be about four milliseconds.

The synchronizing system of the invention requires a somewhat more complex installation when compared with conventional synchronizing systems. It, however, provides excellent results when used in a time-division multiplexed PCM wireless transmission system, particularly when used in long-distance transmission equipment such as microwave over-the-horizon transmission. The more complex system of this invention is warranted since it can confirm the loss of synchronism and restore the synchronism within a short period of time with excellent accuracy.

From the foregoing, it will be realized that this invention discloses a novel method for synchronizing the transmitter and receiver in a communication system. This method requires that both channel and frame synchronizing signals be included in the transmitted signals, with the channel synchronizing signals having a detectable recurrent pattern such as 0101 or 001 etc. The receiver then senses all the synchronizing signals in the transmitted signals. If both frame and channel synchronizing have been lost the receiver will first restore channel synchronism and then frame synchronism. If either channel or frame synchronisms only have been lost, the receiver will restore the lost synchronism.

It is to be realized that the information signals to be transmitted need not be telephone signals referred to in the above description but may also be analogue quantities, such as: values obtained by a telemeter instrument; video signals; and frequency-division multiplexed telegraph or telephone signals. Additionally, the number of digits in a channel information PCM pulse group need not be seven but may be any other integer as required by the nature of the information signals and the quality of the transmission path. Furthermore, the channel synchronizing pulse need not be disposed at the end of each of the frame synchronizing and the PCM channel information pulse groups but instead may be disposed before or interposed among each of the pulse groups. Finally, the duration of each unit pulse need not be equal to the time interval assigned thereto but may be half or any other fraction of such a time interval.

While I have described above the principles of my invention in connection with specific embodiments, it is to be clearly understood that this description is made only by way of example, and not as a limitation to the scope of my invention as set forth in the objects thereof and in the accompanying claims.

What is claimed is:

1. A multiplex pulse code modulation signal transmitter including synchronization and comprising:

a plurality of signaling channels for transmitting different signals;

oscillation means for producing bit timing pulses having a preselected frequency;

logic circuit means activated by said bit timing pulses for producing a train of channel timing pulses; each produced in response to a preselected number of successive bit timing pulses, said circuit means also producing a train of channel synchronizing pulses, each produced in response to a number of successive bit timing pulses twice said preselected number thereof;

circuit means activated by said channel timing pulses for cyclically producing a preselected number of channel control signals, each latter cycle having a number of control signals equal to the number of signaling channels constituting said plurality thereof; each of said last-mentioned control signals having a time duration equal to another preselected number of said bit timing pulses, said last-mentioned means also cyclically producing groups of frame synchronizing code elements; each latter group produced after the production of a final control signal in each production cycle of said control signals and having a predetermined number of code elements;

a circuit means activated by said channel control signals for cyclically translating said channel signals into successive groups of multiplex pulse code modulation signal code elements; each latter group representing said signal of one of said signaling channels and having a number of code elements equal to said predetermined number of code elements in each of said groups of frame synchronizing code elements;

synchronizing interposing circuit means responsive to said groups of signal code elements; said channel synchronizing pulses and said groups of frame synchronizing code elements for interposing one of said frame synchronizing code element groups after each of said signal code element groups representing the signal translated from the last signal channel in each translating cycle of said signals in said signaling channels; said interposing means also alternately interposing "0" and "1" channel synchronizing bits after said frame synchronizing and signal code element groups in such manner that a "0" bit is always interposed after each of said interposed frame synchronizing code element groups; said signal code element groups having said frame synchronizing code element groups and channel synchronizing "0" and "1" bits interposed therebetween constituting synchronized signal code element groups;

and carrier means for transmitting said groups of signal code elements having said interposed groups of frame synchronizing code elements and said channel synchronizing "0" and "1" bits.

2. The transmitter according to claim 1 in which said logic circuit means comprises:

an AND gate;

and a plurality of interconnected flip-flop circuits each having a first output connected to one input of said AND gate; a first of said flip-flop circuits having an input connected to said bit timing oscillation means and a second output connected to an input of a second of said flip-flop circuits; said second flip-flop circuit having a second output connected to an input of a third of said flip-flop circuits; said third flip-flop circuit having said first output connected to an input of a fourth of said flip-flop circuits and a second output providing said train of channel timing pulses, each latter timing pulse having a time duration equal to the time duration of four successive bit timing pulses; said AND gate responsive to said first outputs of said flip-flop circuits for providing said train of channel synchronizing pulses, each latter pulse having the time duration of one of said bit timing pulses.

3. The transmitter according to claim 2 in which each of said channel timing pulses represents one channel interval, and said channel control pulse producing means comprises:

a first plurality of sixteen electric leads;

a first matrix having a plurality of outputs connected to corresponding ends of said leads and a plurality of inputs of which one is connected to said second output of said third flip-flop circuit;

a second plurality of flip-flop circuits, each having two outputs connected to two of said matrix inputs; said second flip-flop circuits having outputs initially adjusted to preselected states; a first of said second flip-flop circuits having an input connected to said second output of said first-mentioned third flip-flop circuits; one of said outputs of said last-mentioned first flip-flop circuits connected to an input of a second of said second flip-flop circuits; one of said outputs of said last-mentioned second flip-flop circuit connected to an input of a third of said second flip-flop circuits; one of said outputs of said last-mentioned third flip-flop circuit connected to an input of a fourth of said flip-flop circuits; said matrix activated by said channel timing pulses, and pulses supplied from said outputs of said first, second, third and fourth of said second flip-flop circuits as said outputs of said latter circuits are changed from said preselected states to different states and thereafter are restored to said preselected states in response to each cycle of 2, 4, 8 and 16, respectively, of said channel intervals for supplying to said electric leads output pulses having leading edges corresponding to leading edges of first through sixteen of said last-mentioned channel timing pulses; one of said matrix output pulses supplied to each of said leads in turn during each of said channel timing pulses during a repetition period of 16 of said channel intervals;

a second plurality of sixteen electric leads;

a second matrix having a plurality of outputs connected to corresponding ends of said second leads and a plurality of inputs;

a third plurality of flip-flop circuits, each having two outputs connected to two of said second matrix inputs; said last-mentioned flip-flop circuits having outputs initially adjusted to preselected states corresponding with said initially preselected states of said second plurality of flip-flop circuits; a first of said third flip-flop circuits having one input connected to one output of said fourth of said second flip-flop circuits; one of said outputs of said last-mentioned first flip-flop circuit connected to an input of a second of said third flip-flop circuits; one of said outputs of said last-mentioned second flip-flop circuits connected to an input of a third of said third flip-flop circuits; one of said outputs of said last-mentioned third flip-flop circuit connected to an input of a fourth of said third flip-flop circuits; said second matrix activated by pulses supplied from outputs of said last-mentioned first, second, third and fourth of said third flip-flop circuits as said last-mentioned circuits are changed from said preselected states to different states and thereafter restored to said preselected states in response to each cycle of 32, 64, 128 and 256, respectively, of said channel intervals for supplying output pulses to said second electric leads, said latter outputs applied to each of said second leads in turn for a duration of 16 channel intervals of a repetition period of 256 of said channel intervals;

a third matrix having a plurality of inputs connected to corresponding other ends of said first and second pluralities of leads and a plurality of outputs, one for each of said signaling channels;

a third plurality of electric leads having corresponding ends connected to said third matrix outputs, each of said latter leads connected to one of said latter outputs;

said third matrix activated by said pulses on said first and second pluralities of leads for producing said preselected number of channel control signals on said third plurality of leads, each of said last-mentioned signals having a time duration equal to the time duration of four of said bit timing pulses in succession; one of said last-mentioned channel control pulses provided on each of said last-mentioned leads in turn.

4. The transmitter according to claim 3 in which said third matrix includes an additional lead providing a further control signal having a time duration equal to the time duration of each of said last-mentioned channel control signals and produced after the production of the last channel control signal representing the last of said signaling channels in each production cycle of said channel control signals; and in which said channel control signal producing means includes delay means activated by said last-mentioned further control signal for adding a time delay equal to the time duration of one of said bit timing pulses to provide a train of frame synchronizing pulse control pulses, each having a time duration equal to the time duration of five of said last-mentioned bit timing pulses in succession; said last-mentioned control pulses activating said pluralities of second and third flip-flop circuits to said initially adjusted preselected states after the production of the last channel control signal in each production cycle of said channel control signals.

5. The transmitter according to claim 3 in which said channel control signal producing means includes second logic means for generating said successive groups of frame synchronizing pulse code elements; said last-mentioned means comprising a second AND gate activated by said channel timing pulses and said frame synchronizing pulse control pulses for producing output pulses; and a multivibrator activated by said last-mentioned AND gate output pulses for producing said successive groups of frame synchronizing code elements.

6. The transmitter according to claim 5 in which said synchronizing pulse interposing circuit means comprises an OR gate having an input activated by said signal code element groups, said channel synchronizing "0" and "1" bits and said frame synchronizing code element groups for interposing said frame synchronizing code element groups and said "0" and "1" channel synchronizing bits between said signal code element groups.

7. The transmitter according to claim 5 in which said predetermined number of code elements in each of said frame synchronizing code element groups comprises a combination of seven "1" bits represent equal magnitudes of voltage; and said number of code element in each of said signal code element groups includes seven bits in different combinations of "0" and "1" bits, each latter signal code element group representing said signal voltage in one of said signaling channels.

8. The multiplex pulse code modulation signal transmitter according to claim 1 including, in combination:

a receiver comprising:

means for receiving said carrier transmitted groups of signal code elements having said interposed groups of frame synchronizing code elements and channel synchronizing "0" and "1" bits;

means for demodulating said received carrier transmitted signal code element groups to provide a demodulated pulse train corresponding with said transmitter synchronized groups of signal code elements having said groups of frame synchronizing code element and said "0" and "1" channel synchronizing bits interposed therebetween;

detecting means for utilizing one portion of said demodulated pulse train to derive local bit timing pulses synchronized with said transmitted bit timing pulses;

second logic means activated by said local bit timing pulses for producing a train of local channel timing pulses, a train of interchannel pulses, each latter pulse having a leading edge preceding a leading edge of each of said last-mentioned channel timing pulses by a time interval equal to that of one of said local bit timing pulses, and a local train of alternate reference "0" and "1" channel synchronizing bits having repetition time periods equivalent to the repetition time periods of said transmitter "0" and "1" channel synchronizing bits;

third logic means for monitoring coincidence between said transmitter "0" and "1" channel synchronizing bits in a second portion of said demodulated pulse train and said reference "0" and "1" channel timing bits to produce error signals only in response to failures of said last-mentioned coincidence;

decoding means activated by said local channel timing pulses, said local bit timing pulses, and a third portion of said demodulated pulse train for cyclically producing voltages successively discrete corresponding to the voltages in said transmitter signaling channels; each last-mentioned produced voltage corresponding to the signal voltage in one of said transmitter signaling channels;

load means for utilizing said corresponding voltages;

fourth logic means activated by said local bit timing pulses, said local channel timing pulses, said interchannel pulses and said demodulated pulse code train received at said decoding means for cyclically distributing said corresponding voltages to said load; each corresponding voltage distributed in turn to said load so long as said frame synchronizing code element groups are received at said decoding means; said last-mentioned logic means producing an error signal only when said last-mentioned frame synchronizing code element groups fail to arrive at said decoding means;

and fourth logic means responsive to said third and fourth logic means error signals for delaying the production of said reference "0" and "1" channel synchronizing bits for a time interval equal to such number of local bit timing pulses as is required to restore said coincidence between said last-mentioned reference "0" and "1" channel synchronizing bits transmitter "0" and "1" channel synchronizing pulses.

9. The multiplex pulse code modulation signal transmitter according to claim 1 including, in combination:

a receiver comprising:

means for receiving said carrier transmitted groups of signal code elements having said interposed groups of frame synchronizing code elements and "0" and "1" channel synchronizing bits;

means for demodulating said received carrier transmitted signal code element groups having said interposed frame synchronizing code element groups and "0" and "1" channel synchronizing bits to provide a demodulated pulse train corresponding to said transmitter groups of signal code elements having said interposed groups of frame synchronizing code elements and said "0" and "1" bit channel synchronizing bits;

detecting means for utilizing one portion of said demodulated pulse train to derive local bit timing signals synchronized with said transmitter bit timing pulses;

second logic means activated by said local bit timing pulses for producing a train of local channel timing pulses, a train of interchannel pulses, each latter pulse having a leading edge preceding a leading edge of each of said last-mentioned channel timing pulses by a time interval equal to that of one of said local bit timing pulses, and a local train of alternate reference "0" and "1" channel synchronism bits having time periods equal to the time periods of said transmitter "0" and "1" channel synchronizing bits;

third logic means for monitoring coincidence between said transmitter "0" and "1" channel synchronizing bits in a second portion of said demodulated pulse train and said reference "0" and "1" channel timing bits; said last-mentioned logic means producing error signals only in response to failures of said coincidence;

decoding means activated by said local channel timing pulses and said local bit timing pulses for decoding a third portion of said demodulated pulse train to produce cycles of successively discrete voltages each latter voltage corresponding to a signal in one of said transmitter signaling channels;

fourth logic means activated by said local bit timing pulses, said local channel timing pulses, said interchannel pulses and a fourth portion of said demodulated pulse train for producing one frame synchronism detection pulse for each demodulated frame synchronizing code element pulse group received at said decoding means;

pulse distributing means for cyclically distributing said corresponding voltages into local signaling channels having a number equal to the number of said transmitter signaling channels, each latter local channel corresponding to one of said transmitter signaling channels;

channel pulse distributing generating means for cyclically generating local channel control signals, each latter cycle having a number of local control signals equal to the number of said local signaling channels, each latter control signal controlling said pulse distributing means to supply each of said corresponding voltages to one of said local signaling channels representing one of said transmitter signaling channels during each cycle of said corresponding voltage distribution; said last-mentioned generating means also producing one frame synchronizing reference pulse at the generation of the last control signal in each generating cycle thereof in response to each of said frame synchronizing code element pulse groups in said third portion of said demodulated pulse train as received at said decoding means;

frame synchronism error signal generating means for monitoring coincidence between said frame synchronism detection pulses and said frame synchronism reference pulses in such manner as to provide frame synchronism error pulses upon failures of said last-mentioned pulse coincidence; one portion of each latter error signal activating said pulse distributing means to stop the distribution of said corresponding voltages; said channel pulse distributing generating means activated by said local channel timing pulses and said last-mentioned error signals to cyclically produce said last-mentioned channel control signals for actuating said pulse distributing means to distribute said corresponding signals into said local signaling channel after said last-mentioned coincidence failures;

load means for utilizing said corresponding signals as received from said local signaling channels;

and fifth logic means responsive to said third logic means error signals and said frame sychronism generating means error signals for delaying the production of said reference "0" and "1" channel synchronism bits for a time interval equal to such number of local bit timing pulses as is necessary to restore said coincidence between said last-mentioned reference "0" and "1" bits and said demodulated transmitter "0" and "1" channel cynchronizing bits.

10. A multiplex pulse code modulation signal transmitter including synchronization and comprising:

a plurality of signaling channels;

oscillation means for producing bit timing pulses of predetermined frequency;

first flip-flop circuit means activated by said bit timing pulses for producing separate trains of channel timing pulses and channel synchronizing pulses; each channel timing pulse produced in response to a preselected number of said bit timing pulses and constituting a channel interval; and each channel synchronizing pulse produced in response to said timing bits having a number twice said preselected number thereof;

second flip-flop circuit means adjusted initially to preselected states and responsive to said channel timing pulses varying at periods of 2, 4, 8 and 16 times the repetition rate of said last-mentioned pulses to change said circuits from said preselected states to different states and back to said preselected states for producing a train of output pulses having a repetition period of 16 of said channel intervals;

third flip-flop circuit means connected to said second flip-flop circuit means and initially adjusted to preselected states; said last-mentioned circuit means responsive to said channel timing pulses varying in periods of 32, 64, 128 and 256 of said channel intervals for producing a train of groups of output pulses, each of said last-mentioned groups having a duration equal to 16 of said channel intervals, and said last-mentioned groups of pulses having a repetition rate of 256 channel intervals;

matrix means activated by said trains of output pulses supplied by said second and third flip-flop circuit means for cyclically producing a plurality of channel control signals, each having a time duration equal to a second preselected number of said bit timing pulses and corresponding to one of said signaling channels; said matrix means also producing a further control signal after the production of the last of said channel control signals in each production cycle thereof;

delay means activated by said further control signal for adding a time delay equal to the time duration of one of said bit timing pulses to provide a train of frame synchronizing pulse control pulses; each having a time duration of five of said bit timing pulses; said last-mentioned pulses cyclically adjusting said second and third flip-flop circuits to said preselected states thereof at said repetition rate of 256 of said channel intervals;

circuit means activated by said channel control signals in said matrix output for cyclically translating said channel signals into successive groups of pulse code modulation signal code elements, each of said last-mentioned groups representing the signal in one of said signaling channels and comprising a preselected number of code elements;

logic means actuated by said channel timing pulses and said frame synchronizing pulse control pulses to generate a train of groups of frame synchronizing code elements, each of said last-mentioned groups comprising a number of code elements equal to said preselected number of code elements in each group of signal code elements representing the signal in one of said signaling channels;

synchronizing pulse interposing circuit means activated by said signal code element groups, said channel synchronizing pulses and said frame synchronizing code element groups for interposing one of said frame synchronizing code element groups after each of said signal code element groups representing the signal translated from the last signaling channel in each translating cycle of said signals in said signaling channels; said means also alternately interposing "0" and "1" bits after said frame sychronizing and signal code element groups in such manner that a "0" bit is always interposed after each of said last-mentioned frame synchronizing code element groups; said signal code element groups having said frame synchronizing code element groups and channel synchronizing "0" and "1" bits interposed therebetween constituting synchronized signal code element groups;

and means for carrier transmitting said groups of signal code element groups having said frame synchronizing code element groups and said channel synchronizing "0" and "1" bits interposed therebetween.

11. A receiver for cyclically transmitted synchronized carrier multiplex pulse code modulation signals comprising a predetermined number of groups of pulse code modulation signal code elements in each transmission cycle, each group including a preselected number of code elements and derived from one of a plurality of signal channels during each transmission cycle; groups of frame synchronizing code elements, each latter group including a preselected number of code elements equal to said preselected number of code element pulses in each of said signal code element groups and interposed after the last signal code element group in each transmission cycle; and a train of "0" and "1" channel synchronizing bits alternately interposed between said signal and frame synchronizing code element groups in each transmission cycle, commencing with one of said "0" bits interposed after each of said frame synchronizing code element groups; said signal and frame synchronizing code element groups and "0" and "1" channel synchronizing bits synchronized with first bit timing pulses having a preselected frequency, comprising:

means for receiving said cyclical synchronized carrier transmitted pulse code modulation signal code element groups interposed with said frame synchronizing code element groups and "0" and "1" frame synchronizing bits;

means for demodulating said received carrier transmitted signals to produce a demodulated pulse train including signal code element groups, frame synchronizing code element groups and "0" and "1" channel synchronizing bits corresponding to said transmitted signal code element groups, frame synchronizing code element groups and "0" and "1" channel synchronizing bits;

means for utilizing one portion of said demodulated pulse train to derive local bit timing pulses synchronized with said first bit timing pulses;

first logic means activated by said local bit timing pulses for producing reference "0" and "1" channel synchronizing bits corresponding in time with said "0" and "1" channel synchronizing bits interposed between said carrier transmitted signal code element groups for monitoring coincidence between said "0" and "1" bits in a second portion of said demodulated pulse train and said reference "0" and "1" channel synchronizing bits to indicate synchronism between corresponding transmitted and received signal code element groups; said logic means also producing a train of local channel timing pulses and a train of interchannel pulses, each latter pulse having a leading edge preceding a leading edge of each latter channel timing pulses by a time interval equal to that of one of said local bit timing pulses;

decoding means responsive to a third portion of said demodulated pulse train, said local channel timing pulses and said local bit timing pulses for producing successive output signals one at a time in each cycle of said received signal code element groups, frame synchronizing code element groups nad "0" and "1" channel synchronizing bits, each latter output signal representing one demodulated signal code element group and corresponding to the signal in one of said first-mentioned signal channels;

load means having a plurality of input signal channels for utilizing said corresponding signals, each latter channel preselected to receive a particular one of said corresponding signals; said last-mentioned channels representing said first-mentioned signal channels;

and second logic means activated by a fourth portion of said demodulated pulse train, said local channel synchronizing pulses, said interchannel pulses and said local bit timing pulses for supplying each of said particular one corresponding signals to one of said preselected load channels in response to each occurrence of said frame synchronizing code element groups in said demodulated pulse train as representing said signal in a corresponding one of said first-mentioned signal channels.

12. The receiver according to claim 11 in which the occurrence of said frame synchronizing code element groups in said second logic means is interrupted for producing frame synchronizing error signals to terminate the supply of said particular one corresponding signals to said preselected load channels; and in which said first logic means includes:

third logic means activated by said "0" and "1" channel synchronizing bits in said second portion of said demodulated pulse train and said reference "0" and "1" channel synchronism bits for producing channel synchronism error signals in response to failures of coincidence between said reference "0" and "1" channel synchronizing bits and said "0" and "1" channel synchronizing pulses in said last-mentioned demodulated pulse train;

and channel synchronism adjusting logic means activated by said frame synchronizing error signals and said channel synchronism error signals in addition to said local bit timing pulses for producing voltages to activate said first logic means to delay the production of said reference "0" and "1" channel synchronizing bits for time periods equal to such number of said last-mentioned local bit timing pulses as is necessary to restore said coincidence between said last-mentioned reference "0" and "1" channel synchronizing bits and said "0" and "1" channel synchronizing pulses in said second portion of said demodulated pulse train.

13. The receiver according to claim 11 in which said second logic means includes:

channel control means for controlling the supply of said corresponding signals to said preselected load means channels in each decoding cycle of said demodulated pulse train third portion;

frame synchronism detection logic means activated by said frame synchronizing code element groups in another portion of said pulse train, said local bit timing pulses, said interchannel pulses and said local channel timing pulses for producing a frame synchronism detection pulse each time one of said last-mentioned frame synchronizing code element groups appears in said last-mentioned demodulated pulse train portion;

frame synchronism reference logic means for producing a frame synchronism reference pulse in response to the occurrence of each frame synchronizing code element group in said third portion of said demodulated pulse train at said decoding means;

fourth logic means including and AND gate;

and frame synchronism monitoring logic means responsive to coincidence between said last-mentioned frame synchronism detection pulses and said frame synchronism reference pulses for activating said fourth logic means to close said AND gate as said frame synchronizing code element groups are received in each cycle of said third portion of said demodulated pulse train at said decoding means to enable said channel control means to supply said corresponding signals to said preselected load means channels.

14. The receiver according to claim 13 in which said channel control means comprises:

pulse distributor means connected between an output of said decoding means and said load means channels for controlling the supply of said corresponding signals to said preselected load means channels in each decoding cycle of said demodulated pulse train third portion;

channel pulse distributor control signal generating means having an output connected to an input of said pulse distributor means for generating a plurality of channel control pulses having a number equal to the number of said corresponding signals in each decoding cycle of said demodulated pulse train third portion to activate said pulse distributor means to supply each of said corresponding signals to one of said preselected load means channels as each of said frame synchronizing code element groups is received at said frame synchronism detection logic means in each decoding cycle of said demodulated pulse train third portion; said last-mentioned channel pulse distributor generating means also generating an additional channel control pulse after the last channel control pulse in each of said plurality thereof;

and delay means delaying said additional channel control pulse for a time interval equal to a predetermined number of said local bit timing pulses; said last-mentioned delayed additional control pulse and said local channel timing pulses serving to reset said channel pulse distributor generating means to the first channel control signal in each plurality thereof as each of said frame synchronizing code element groups is received at said frame synchronism detection logic means in each decoding cycle of said demodulated pulse train third portion.

15. A time-division multiplex pulse code modulation signal transmission system including synchronization and comprising:

(a) a transmitter including:

a plurality of channels for transmitting different signals;

oscillation means for producing bit timing pulses having a preselected frequency;

first logic circuit means activated by said bit timing pulses for producing a train of channel timing pulses, each produced in response to a preselected number of successive bit timing pulses; said circuit means also producing a train of channel synchronizing pulses, each produced in response to a number of successive bit timing pulses twice said preselected number thereof;

second logic circuit means activated by said channel timing pulses for cyclically producing a preselected number of channel control signals; each cycle having a number of channel control signals equal to the number of signaling channels in said plurality thereof; each of said last-mentioned control signals having a time duration equal to another preselected number of said bit timing pulses; said last-mentioned means also cyclically producing groups of frame synchronizing code elements; each latter group produced after the production of a final control signal in each production cycle of said control signals and having a predetermined number of code elements;

circuit means activated by said channel control signals for cyclically translating said channel signals into successive groups of multiplex pulse code modulation signal code elements; each latter group representing said signal of one of said signaling channels and having a number of code elements equal to said predetermined number of code elements in each of said groups of frame synchronizing code elements;

synchronizing pulse interposing circuit means responsive to said groups of signal code elements, said channel synchronizing pulses and said groups of frame synchronizing code elements for interposing one of said frame synchronizing code element groups after each of said signal code element groups representing the signal translated from the last signal channel in each translating cycle of said signals in said signaling channels; said interposing means also alternately interposing "0" and "1" bits after said frame synchronizing and signal code element groups in such manner that a "0" bit is always interposed after each of said interposed frame synchronizing code element groups;

and carrier means for transmitting said groups of signal code elements having said groups of synchronizing code elements and channel synchronizing "0" and "1" bits interposed therebetween;

(b) and a receiver including:

receiving said carrier transmitted signal code element groups having said groups of frame synchronizing code elements and channel synchronizing "0" and "1" bits interposed therebetween;

means for demodulating said received carrier transmitted signal code element groups having said interposed frame synchronizing pulses to provide a demodulated pulse train corresponding to said transmitter groups of signal code elements having said frame synchronizing code element groups and said "0" and "1" channel synchronizing bits interposed therebetween;

means for utilizing one portion of said last-mentioned demodulated pulse train to derive local bit timing pulses synchronized with said transmitter bit timing pulses;

third logic means activated by said local bit timing pulses for producing a train of local channel timing pulses, a train of interchannel pulses, each latter pulse having a leading edge preceding a leading edge of each of said last-mentioned channel timing pulses by a time interval equal to that of one of said local bit timing pulses, and a local train alternate reference "0" and "1" channel synchronizing bits having repetitive time periods equivalent to the repetitive time periods of said transmitter "0" and "1" channel synchronizing bits, respectively;

fourth logic means for monitoring coincidence between said reference "0" and "1" channel synchronizing bits and said demodulated transmitter "0" and "1" channel synchronizing bits in a second portion of said demodulated pulse train having said signal code element groups and last-mentioned channel synchronizing bits interposed therebetween to produce error signals only in response to failures of said last-mentioned coincidence;

decoding means activated by said local bit timing pulses and said local channel timing pulses for decoding a third portion of said demodulated pulse train to produce repetitive cycles of successive discrete voltages, each latter voltage of each cycle corresponding to a signal in one of said transmitter signaling channels;

fourth logic means activated by said local bit timing pulses, said interchannel pulses, said local channel timing pulses and a fourth portion of said demodulated pulse train having said interposed frame synchronizing code element groups for producing one frame synchronism detection pulse as each latter frame synchronizing code element group is received in said last-mentioned demodulated signal fourth portion;

pulse distributing means for cyclically distributing said corresponding voltages into local signaling channels having a number equal to the number of said transmitter signaling channels; each local channel representing one of said transmitted signaling channels;

channel pulse distributing generating means for cyclically generating load successive channel control signals, each latter cycle having a number of local control signals equal to the number of said local signaling channels; each latter control signal in turn activating said pulse distributing means to supply one of said corresponding voltages into a predetermined one of said local signaling channels as representing one of said transmitter signaling channels during each cycle of said last-mentioned local control signal generation; said last-mentioned generating means also producing one frame synchronizing reference pulse at the generation of the last control signal in each of said generating cycles of local control signals as each of said frame synchronizing code element pulse group is received in said third portion of demodulated pulse train decoded in said decoding means;

frame synchronism error signal generating means for monitoring coincidence between said frame synchronism detection pulses and said frame synchronism reference pulses in such manner as to produce frame synchronism error pulses only upon failures of said last-mentioned pulse coincidence; said local channel timing pulses and said last-mentioned error signals activating said channel pulse distributing generating means to cyclically produce said last-mentioned channel control signals for activating said pulse distributing means to supply said corresponding voltages into said predetermined ones of said local channels after said last-mentioned coincidence failures;

load means for utilizing said corresponding signals taken from said pulse distributing means signaling channels in turn;

and fifth logic means responsive to said fourth logic means error signal and said frame synchronism error signal generating means for delaying the production of said reference "0" and "1" channel synchronizing bits for a time interval equal to such number of local bit timing pulses as is necessary to restore said coincidence between said last-mentioned reference "0" and "1" channel synchronizing bits and said demodulated transmitter "0" and "1" channel synchronizing bits.

16. A multiplex pulse code modulation signal transmitter including synchronization, comprising:

a plurality of channels for transmitting signals;

oscillation means for generating a train of bit timing pulse signals having a preselected frequency;

first logic circuit means for generating trains of channel timing pulses and channel synchronizing pulses, including:

a first AND gate;

and a first plurality of interconnected flip-flop circuits, each having a first output connected to one input of said AND gate; a first of said flip-flop circuits having an input connected to said bit timing oscillation generating means and a second output connected to an input of a second of said flip-flop circuits; said second flip-flop circuits having a second output connected to an input of a third of said flip-flop circuits; said third flip-flop circuits having said first output connected to an input of a fourth of said flip-flop circuits and a second output providing a train of channel timing pulses in response to a preselected number of said bit timing pulses; each channel timing pulse having a time duration equal to another preselected number of said bit timing pulses and representing one signal channel interval; said AND gate responsive to said first outputs of said flip-flop circuits for providing an output containing a train of channel synchronizing pulses, each produced in response to a number of successive bit timing pulses twice said preselected number thereof;

circuit means for producing channel control pulses, comprising:

a first plurality of sixteen electric leads;

a first matrix having a plurality of outputs connected to corresponding ends of said leads and a plurality of inputs of which one is connected to said second output of said third flip-flop circuit;

a second plurality of flip-flop circuits, each having two outputs connected to two of said matrix inputs; said last-mentioned flip-flop circuits initially adjusted to preselected states; a first of said second flip-flop circuits having an input connected to said second output of said first-mentioned third flip-flop circuit; one of said outputs of said last-mentioned first flip-flop circuit connected to an input of a second of said second flip-flop circuits; one of said outputs of said last-mentioned second flip-flop circuit connected to an input of a third of said second flip-flop circuits; one of said outputs of said last-mentioned third flip-flop circuit connected to an input of a fourth of said second flip-flop circuits; said matrix activated by said channel timing pulses and signals supplied from said outputs of said last-mentioned first, second, third and fourth of said second flip-flop circuits as said latter circuits are changed from said preselected states to different states and from said latter states back to said preselected states in response to each cycle of 2, 4, 8 and 16, respectively, of said channel intervals for supplying to each of said first electric leads in turn an output pulse having a leading edge corresponding to a leading edge of one of said last mentioned channel timing pulses in each of successive groups having sixteen output pulses varying at a repetition period of sixteen channel intervals; one of said matrix output pulses supplied to each of said leads in turn;

a second plurality of sixteen electric leads;

a second matrix having a plurality of outputs connected to corresponding ends of said second leads and a plurality of inputs;

a third plurality of flip-flop circuits, each having two outputs connected to two of said second matrix inputs; said last-mentioned flip-flop circuits initially adjusted to preselected states corresponding with said initially preselected states of said second plurality of flip-flop circuits; a first of said third flip-flop circuits having one input connected to one output of said fourth of said second flip-flop circuits; one of said outputs of said last-mentioned first flip-flop circuit connected to an input of a second of said third flip-flop circuits; one of said outputs of said last-mentioned second flip-flop circuit connected to an input of a third of said third flip-flop circuits; one of said outputs of said last-mentioned third flip-flop circuit connected to an input of a fourth of said third flip-flop circuits; said second matrix activated by pulses supplied from outputs of said last-mentioned first, second, third and fourth of said third flip-flop circuits as said last-mentioned circuits are changed from said preselected states to different states and thereafter restored to said preselected states in response to each cycle of 32, 64, 128 and 256, respectively, of said channel intervals for supplying successive groups of sixteen channel timing pulses to said second electric leads, one of said last-mentioned pulse groups applied to each of said second leads in turn in response to each of said last-mentioned groups of channel timing pulses varying at a repetition period of 256 channel intervals, whereby successive corresponding leads of said first and second pluralities thereat are simultaneously supplied with one and sixteen channel timing pulses, respectively, by said first and second matrix output pulses;

a third matrix having a plurality of inputs connected to corresponding other ends of said first and second pluralities of leads and a plurality of outputs, each latter output for one of said signaling channels; said third matrix also having a further output;

said third matrix activated by said pulses on said first and second pluralities of leads for producing channel control signals on said third plurality of leads, each of said last-mentioned signals having a time duration equal to the time duration of four of said bit timing pulses; one of said last-mentioned channel control signals provided on each of said last-mentioned leads in turn; said third matrix also supplying a further control signal to said additional lead after the production of the last channel control signal representing the last signaling channel in each production cycle of said channel control signals;

and delay means activated by said further control signal for adding a time delay equal to the time duration of one of said bit timing pulses to provide a train of frame synchronizing pulse control pulses, each having a time duration equal to the time duration of five of said last-mentioned bit timing pulses; said last-mentioned frame synchronizing pulse control pulses activating said second and third pluralities of flip-flop circuits to said preselected states after each of said 241 channel intervals;

second logic circuit means comprising a second AND gate and a multivibrator connected in sequence; said second AND gate activated by said channel timing pulses and said frame synchronizing pulse control pulses for causing said multivibrator to produce successive groups of frame synchronizing code elements, each latter group comprising a predetermined number of "1" bits;

sampling circuit means activated by said channel control signals derived from said third plurality of leads for cyclically translating said channel signals into successive groups of multiplex pulse code modulation signal code elements, each latter group having a number of code elements equal to said predetermined number of code elements in each of said frame synchronizing code element groups;

synchronizing pulse interposing circuit means responsive to said groups of signal code elements, channel synchronizing pulses and said frame synchronizing code element groups for interposing one of said frame synchronizing code element groups after each of said groups of signal code elements translated from the last signal channel in each translating cycle of said signals in said signaling channels; said last-mentioned interposing means also alternately interposing "0" and "1" bits after said pulse modulation signal and frame synchronizing code element groups in such manner that a "0" bit is always interposed after each of said last-mentioned frame synchronizing code element groups;

and means for transmitting said signal code element groups having said frame synchronizing code element groups and said channel synchronizing "0" and "1" bits interposed therebetween.

17. A receiver for cyclically transmitted synchronized carrier pulse code modulation signals comprising a predetermined number of groups of signal code elements in each transmission cycle, each group including a preselected number of code elements and derived from a signal in one of a plurality of signal channels during each transmission cycle; groups of frame synchronizing code elements; each latter group including a preselected number of code elements equal to said preselected number of code element pulses in each of said signal code element groups and interposed after the last signal code element pulse group in each transmission cycle; and a train of "0" and "1" channel synchronizing bits alternately interposed between said signal and frame synchronizing code element groups in each transmission cycle, commencing with one of said "0" bits interposed after each of said frame synchronizing code element groups; said signal and frame synchronizing code elements and "0" and "1" channel synchronizing bits synchronized with bit timing pulses having a preselected frequency, comprising:

means for receiving said cyclically transmitted synchronized carrier pulse code modulation signals having said interposed frame synchronizing code element groups and "0" and "1" channel synchronizing bits;

means for demodulating said received signals to produce a demodulated pulse train including said signal code element groups interposed with said frame synchronizing code element groups and "0" and "1" channel synchronizing bits corresponding with said transmitted signal code element groups interposed with said frame synchronizing code element groups and "0" and "1" channel synchronizing bits;

detecting means for utilizing one portion of said demodulated pulse train to derive local bit timing pulses synchronized with said first-mentioned bit timing pulses;

first logic means responsive to said local bit timing pulses for producing trains of "0" and "1" channel synchronism reference bits corresponding with said "0" and "1" channel synchronizing bits in said demodulated pulse train, a train of local channel timing pulses, and a train of interchannel pulses;

second logic means activated by a second portion of said demodulated pulse train for monitoring coincidence between said "0" and "1" channel synchronizing bits in said demodulated pulse train and said reference "0" and "1" channel synchronizing bits, respectively, to produce an error signal upon failure of said last-mentioned coincidence;

decoding means activated by said local bit timing pulses and said local channel timing pulses for cyclically decoding a third portion of said demodulated pulse train to provide successive discrete amplitude-modulated voltages in each decoding cycle; each latter voltage representing one demodulated signal code element group and corresponding to the signal voltage in one of said first-mentioned signaling channels;

load means having a plurality of input channels for utilizing said corresponding signals; each latter channel predetermined to receive a particular one of said corresponding voltage and representing one of said first-mentioned signal channels;

pulse distributor means interposed between said decoding means and said load means for distributing said corresponding voltages to said load means channels in such manner that each particular one corresponding voltage is distributed to a predetermined load means channel;

channel distributor control means cyclically producing a plurality of successive channel control signals in each decoding cycle; said last-mentioned channel control signals having a number equal to the number of said load means channels; each latter signal in turn activating said pulse distributor means to distribute each particular one corresponding voltage to one of said predetermined load means channels; said last-mentioned channel distributor control means also producing a further channel control signal as a portion of the last channel control signal in each of said plurality thereof and also producing an additional channel control signal after the production of said further channel control signal;

first delay means for delaying said additional control signal a first time interval equal to a first predetermined number of said local bit timing pulses; said last-mentioned delayed additional control signal and said local channel timing pulses actuating said channel distributor control means to produce said channel control signals, said further control signal and said additional control signal, in turn, in each decoding cycle as said frame synchronizing code element groups are received at said decoding means;

second delay means for delaying said further channel control signals a second time interval equal to a second predetermined number of local bit timing pulses for providing frame synchronism reference pulses;

frame synchronism detecting logic means activated by said local bit timing pulses, said local channel timing pulses, said interchannel pulses and a fourth portion of said demodulated pulse train for producing a frame synchronism detection pulse in response to each frame synchronizing code element group received in each decoding cycle;

frame synchronism error signal generating means, comprising:

a first AND gate activated by said frame synchronism detection pulses and said frame synchronism reference pulses to an open state to transmit said last-mentioned frame synchronizing detecting pulses therethrough;

multi-stage flip-flop means stepped by said frame synchronism detection pulses transmitted through said first AND gate to provide an "0" output in the "0" state of the last flip-flop stage of said flip-flop means;

a second AND gate normally closed and remaining closed in response to said last-mentioned frame synchronism detection pulses and "0" output of said last flip-flop stage of said flip-flop means for enabling said pulse distributor means to continue the distribution of said corresponding voltages to said load means channels;

a third AND gate activated by said local bit timing pulses, said frame synchronism references pulses and a "1" bit output in the "1" state output of said last stage of said flip-flop means to produce other output 1-bit pulses having repetitive period of a frame synchronizing code element group and occurring in the time intervals between said last-mentioned group and the next succeeding demodulated signal code element group in each decoding code;

a NOT-AND gate activated by said last-mentioned other pulses and said frame synchronism code element groups in coincidence for inhibiting said last-mentioned gate to produce a pulse in the output thereof whereby said flip-flop means is exclusively activated by said first AND gate output to step said flip-flop means; said NOT–AND gate activated by said other pulses alone to transmit said last-mentioned other pulses therethrough upon an interruption of the reception of said frame synchronizing code element groups at the input of said frame synchronism detecting means; said NOT–AND gate output pulses stepping said flip-flop means to change said "0" output of said last stage of said flip-flop means to a "1" state for providing a frame synchronism error signal and said "1" output to a "0" output to close said third AND gate to preclude further stepping of said flip-flop means; said last-mentioned error signal applied to said pulse distributor means to prevent further distribution of said corresponding voltages to said load means channels;

a fourth AND gate activated by said frame synchronism detection pulses and said frame synchronism error signals to an open state to pass said frame synchronism detection pulses therethrough;

third delay means delaying said frame synchronism detection pulses in said fourth AND gate output by a time interval equal to a further number of said local bit timing pulses;

an OR gate passing said last-mentioned delayed pulses therethrough to reset said channel distributor control means which is also activated by said channel timing pulses to produce the first channel control signal of said plurality of successive channel control signals until said further channel control signal is delayed in said second delay means to provide said frame synchronism reference pulse; said frame synchronism detection pulses derived in said frame synchronism detecting means after restoration of said frame synchronizing code element group to the input thereof and said last-mentioned frame synchronism reference pulses in coincidence at said first AND gate input serving to restore a "0" output of said last stage of said flip-flop means to an "0" state for canceling said frame synchronism error signal at said pulse distributing means and said channel synchronism adjusting means and thereby enabling said pulse distributing means to supply said corresponding voltages to said load means channels;

and channel synchronism adjusting logic means activated by an error signal produced in said channel synchronism error signal generating means and said frame synchronism error signal to produce voltage pulses for activating said channel synchronizing signal generating means to delay the production of said "0" and "1" reference channel synchronizing bits for a time period equal to such number of said local bit timing pulses as is necessary to restore said coincidence between said last-mentioned "0" and "1" bits and said "0" and "1" pulses in said demodulated pulse train second portion to terminate said error signal due to said failure of said last-mentioned coincidence.

References Cited

UNITED STATES PATENTS

| | | |
|---|---|---|
| 3,065,302 | 11/1962 | Kaneko. |
| 3,065,303 | 11/1962 | Kaneko. |
| 3,069,504 | 12/1962 | Kaneko. |
| 3,087,996 | 4/1963 | Kaneko. |
| 3,112,370 | 11/1963 | Longton. |
| 3,144,515 | 8/1964 | Kaneko. |

ROBERT L. GRIFFIN, Primary Examiner

CARL R. VON HELLENS, Assistant Examiner

U.S. Cl. X.R.

178—53, 69.5